US010083631B2

(12) United States Patent
Forte et al.

(10) Patent No.: US 10,083,631 B2
(45) Date of Patent: Sep. 25, 2018

(54) SYSTEM, METHOD AND COMPUTER PROGRAM FOR TRAINING FOR OPHTHALMIC EXAMINATIONS

(71) Applicant: THE HOSPITAL FOR SICK CHILDREN, Toronto (CA)

(72) Inventors: Vito Forte, Ca (CA); Brian Carrillo, Ca (CA)

(73) Assignee: THE HOSPITAL FOR SICK CHILDREN, Toronto (CA)

( * ) Notice: Subject to any disclaimer, the term of this patent is extended or adjusted under 35 U.S.C. 154(b) by 445 days.

(21) Appl. No.: 14/436,782

(22) PCT Filed: Oct. 21, 2013

(86) PCT No.: PCT/CA2013/000900
§ 371 (c)(1),
(2) Date: Apr. 17, 2015

(87) PCT Pub. No.: WO2014/059533
PCT Pub. Date: Apr. 24, 2014

(65) Prior Publication Data
US 2015/0279238 A1    Oct. 1, 2015

Related U.S. Application Data

(60) Provisional application No. 61/716,121, filed on Oct. 19, 2012.

(51) Int. Cl.
*G09B 5/02* (2006.01)
*G09B 23/30* (2006.01)
(Continued)

(52) U.S. Cl.
CPC ............... *G09B 23/30* (2013.01); *G09B 5/02* (2013.01); *G09B 7/02* (2013.01); *G09B 23/28* (2013.01); *G09B 23/286* (2013.01)

(58) Field of Classification Search
CPC . G09B 23/30; G09B 5/02; G09B 7/02; G09B 23/28; G09B 23/286
(Continued)

(56) References Cited

U.S. PATENT DOCUMENTS 3,905,130 A  *  9/1975  Gordon ................... G09B 23/32
                                                434/271
5,900,923 A  *  5/1999  Prendergast ........... G09B 23/28
                                                351/211
(Continued)

FOREIGN PATENT DOCUMENTS

CA            2831330 A1    10/2012

OTHER PUBLICATIONS

WIPO, International Search Report dated Jan. 7, 2014 issued in corresponding International Patent Application No. PCT/CA2013/000900.
(Continued)

*Primary Examiner* — Robert P Bullington
(74) *Attorney, Agent, or Firm* — Norton Rose Fulbright Canada LLP

(57) ABSTRACT

The present invention is a medical training apparatus and system is provided for training of medical professionals in ophthalmic examinations based on manipulation of a medical tool. The apparatus may comprise a physical model of an eye having an opening through which an image display is visible that simulates the appearance of an eye during ophthalmoscopy. A modified ophthalmoscope includes movement sensors and captures movement information, which is processed by the system to selectively display corresponding sections of images of an eye. The training apparatus is operable for one or more simulations for training a trainee in a medical examination or procedure for a body part in accordance with a training method.

20 Claims, 13 Drawing Sheets

(51) Int. Cl.
*G09B 23/28* (2006.01)
*G09B 7/02* (2006.01)

(58) Field of Classification Search
USPC .......................................................... 434/271
See application file for complete search history.

(56) References Cited

U.S. PATENT DOCUMENTS

2010/0003657 A1* 1/2010 Shibui .................... G09B 23/30
 434/267
2012/0081663 A1* 4/2012 Schmid .................... A61B 3/11
 351/205

OTHER PUBLICATIONS

SIPO, Office Action for CN Application No. 2013800018070 dated Nov. 30, 2016.

* cited by examiner

SYSTEM, METHOD AND COMPUTER PROGRAM FOR TRAINING FOR OPHTHALMIC EXAMINATIONS

PRIORITY

This application claims all benefit, including priority, of U.S. Provisional Patent Application Ser. No. 61/716,121, filed Oct. 19, 2012 entitled SYSTEM, METHOD AND COMPUTER PROGRAM FOR TRAINING FOR OPHTHALMIC EXAMINATIONS.

FIELD OF THE INVENTION

The present invention relates to computer-implemented training systems. The present invention more specifically relates to computer implemented training systems that simulate body parts to build skills pertaining to conducting medical examinations or procedures.

INTRODUCTION

Numerous medical examinations or procedures involve body parts with concealed anatomy, such as the ear, nose, throat or eye. These medical examinations or procedures generally involve the use of a specialized medical tool.

One example such a medical examination includes ophthalmic examination.

Ophthalmic examination involves a series of lenses that are used to look at the back part of the eye. The subject is asked to focus continuously on a selected point, and a series of lenses are used where a more negative lens allows the medical professional to look more deeply into the back part of the retina. Medical professionals administering this examination tend to "dial in" and "dial out" the lenses. The subject tends to blink and then look in a slightly different direction, requiring the medical professional to relocate the centre area of the eye. Medical professionals need to be able to find their way in this environment, and especially to quickly relocate the centre area of the eye.

At most medical schools, training in medical examinations or procedures relating to body parts with concealed anatomy involves visual identification of possible defects or medical conditions. The training is generally conducted through the use of basic tools, such as slide presentations including photos of the physical defects or medical conditions. Some estimate that few medical students feel comfortable about their skills to use specialized medical tools, for example, such as ophthalmoscopes, at the end of their residency or other training.

There is a need for a system for training users in conducting ophthalmic examinations.

SUMMARY

A computer-implemented medical training method is provided comprising: one or more users engaging a simulation computer system to initiate an ophthalmic examination training routine, by means of one or more computer processors, the simulation computer system including an eye model, one or more movement sensors, an image display, and a controller for controlling the image display that displays one or more images of an eye; each of the one or more users moving an ophthalmoscopy tool relative to an eye model in a way that is similar to the movements used to conduct an ophthalmic examination; detecting the movements using the one or more movement sensors so as to generate input information to the controller; and the controller using the input information to select and display a region of interest view from an image of an eye, or image section, that corresponds to the input information, so as to simulate the appearance of an eye in connection with an ophthalmic examination.

In a further aspect, the simulation computer system iteratively: (a) detects and processes movements; (b) selectively displays image sections; and (c) based on consecutive detected/processed movements and corresponding image sections generates a continuous display of image sections that follow the user's movements using the ophthalmoscopy tool so as to simulate the appearance of an eye in connection with an ophthalmic examination.

In another aspect, a computer-implemented medical training method is provided, comprising: (a) one or more users engaging a simulation computer system to initiate an ophthalmic examination training routine, by means of one or more computer processors, the simulation computer system including an eye model, one or more movement sensors, an image display, and a controller for controlling the image display that displays one or more images of an eye; (b) each of the one or more users moving an ophthalmoscope tool relative to an eye model in a way that is similar to the movements used to conduct an ophthalmic examination; (c) detecting the movements using the one or more movement sensors so as to generate input information to the controller; and (d) the controller iteratively using the input information to select and display a region of interest view from an image of an eye, or image section, that corresponds to the input information, and initiate the display of the image section by the image display, so as to simulate the appearance of an eye in connection with an ophthalmic examination, across a set of movements and corresponding input information.

In another aspect, a medical examination training system for simulating ophthalmoscopy is provided comprising: (a) a computer system linked to at least one base unit, and including a controller; (b) the base unit including or receiving one or more physical models of an eye, the physical model including an opening and an image display viewable through the opening, the opening being configured to enable a trainee to line up a connected ophthalmoscopy device with the opening so as to view one or more images displayed by the image display, using the modified ophthalmoscopy device; (c) the computer system defining a starting position, and thereafter tracking a series of movements made by a trainee using the ophthalmoscopy device, the series of movements defining an ophthalmoscopy examination; and (d) the system processing the tracked series of movements so as to generate display control data, the controller using the display control data to control the image display so as to simulate the appearance of a human eye, across the series of movements, in an ophthalmoscopy examination.

In another aspect, an image library is linked to the computer system, and the image library contains one or more images of an eye, and wherein the controller, based on the display control data, selectively displays a particular image section of the image corresponding to the tracked movements.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

The present invention enables the provision of such instruction and permits users to practice examination in an effective manner. The system, computer program, and method of the invention represent a significant advancement of the art, and provide a practical and cost effective system for broader dissemination of such instruction and/or practice.

BRIEF DESCRIPTION OF THE DRAWINGS

The invention will be better understood and objects of the invention will become apparent when consideration is given to the following detailed description thereof. Such description makes reference to the annexed drawings wherein.

Figure 1:
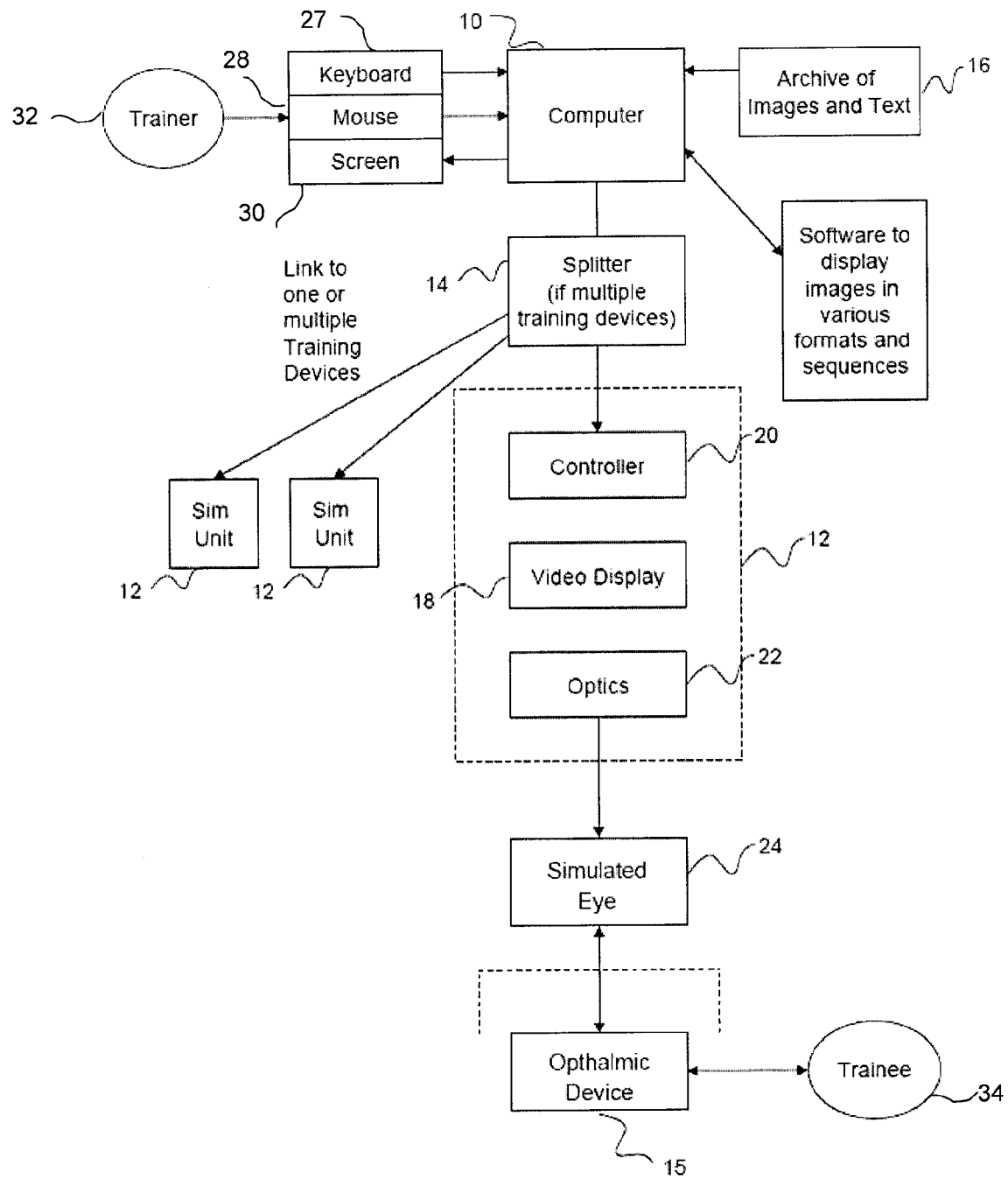
FIG. 1 is a system resource diagram of one embodiment of the present invention.

In the drawings, embodiments of the invention are illustrated by way of example. It is to be expressly understood that the description and drawings are only for the purpose of illustration and as an aid to understanding, and are not intended as a definition of the limits of the invention.

DETAILED DESCRIPTION OF THE INVENTION

The invention is a medical training simulation apparatus, system and computer product that includes: (A) a physical model of an eye; and (B) an image viewer that simulates the viewing of the using an ophthalmoscope in connection with an ophthalmic examination by (i) receiving input based on three-dimensional orientation by a user of a modified ophthalmoscope, and (ii) based on this input displaying a section of an image of an eye that corresponds generally to the section that the user would see using an ophthalmoscope in the three-dimensional orientation.

The disclosure also provides several possible medical training computer systems that incorporate or include one or more of the medical training simulation devices of the present invention.

This disclosure references a "user". There may be various different types of users of the apparatus, system, and computer program of the present invention, however, "user" generally refers to a trainee user.

The ophthalmoscopy training system of the present invention may utilize several aspects of the co-pending patent application PCT/CA2012/000359 for a "System, Method And Computer Program For Training For Medical Examinations Involving Body Parts With Concealed Anatomy" ("Prior patent application"). For example the Prior patent application discloses an optical means for utilizing high quality images (for example high quality, digital images), but using an optical means to display these images in a medical examination training apparatus using a low cost display, and display these images in a manner that simulates the appearance of concealed anatomy. The Prior patent application is incorporated herein by this reference.

The present invention adapts certain aspects of the Prior patent application, as described below, and provides a new system that enables ophthalmoscopy training in a new and innovative way.

A skilled reader will understand that various aspects of the invention disclosed and/or illustrated herein may be modified. For example the medical examination tool illustrated herein may be designed in various embodiments that permit a user to practice different aspects of the use of different examination tools that may be used to conduct ophthalmoscopy examinations. The modified medical examination tool described in this disclosure is one possible embodiment of the modified ophthalmoscope of the present invention, which may be referred to in this disclosure as "the tool".

Ophthalmoscopy Training System and Computer Program

FIG. 1 illustrates one implementation of the medical training system of the present invention, for ophthalmoscopy, by referencing possible system components and their interrelated functions.

Figure 2:
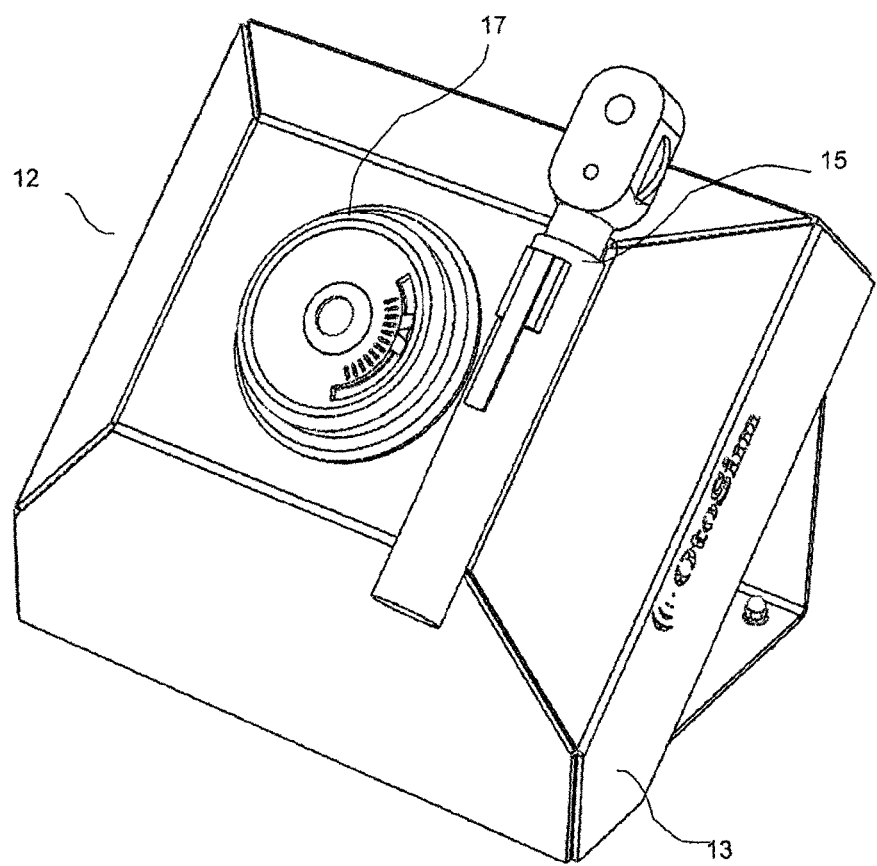
FIG. 2 is a perspective view of a representative embodiment of the medical training simulation apparatus of the present invention, showing the exterior of the apparatus or base unit of the system.

In another aspect of the invention, FIG. 2 includes a representative embodiment of a particular apparatus based on the present invention. In this case a standalone, table-top embodiment of the present invention is shown. FIG. 2 shows a representative "base system" or "simulation unit" of the present invention. The base system includes an eye model. As shown in FIG. 2, a simulation unit 12 is shown including a base unit 13 and an ophthalmoscope device 15.

In one possible embodiment, and as further discussed below, the simulation unit may include a mechanism for calibrating the simulation unit, for example by aligning the ophthalmoscope device 15 to the base unit 13, in part to track movements made by a user using the ophthalmoscope device 15, including relative to the base unit 13, and the eye model in particular. In one possible implementation of invention, a magnet (not shown) may be pre-installed in the handle of the ophthalmoscope device 15 at an appropriate position and orientation such that when the handle is placed on the base unit, the handle self-aligns (in two axes) to the angle of the base unit 13. This ensures that the user needs only align the rotation of the handle in the final axis (twist with respect to the eye model) in order to ensure proper unit functioning.

Figure 3A:
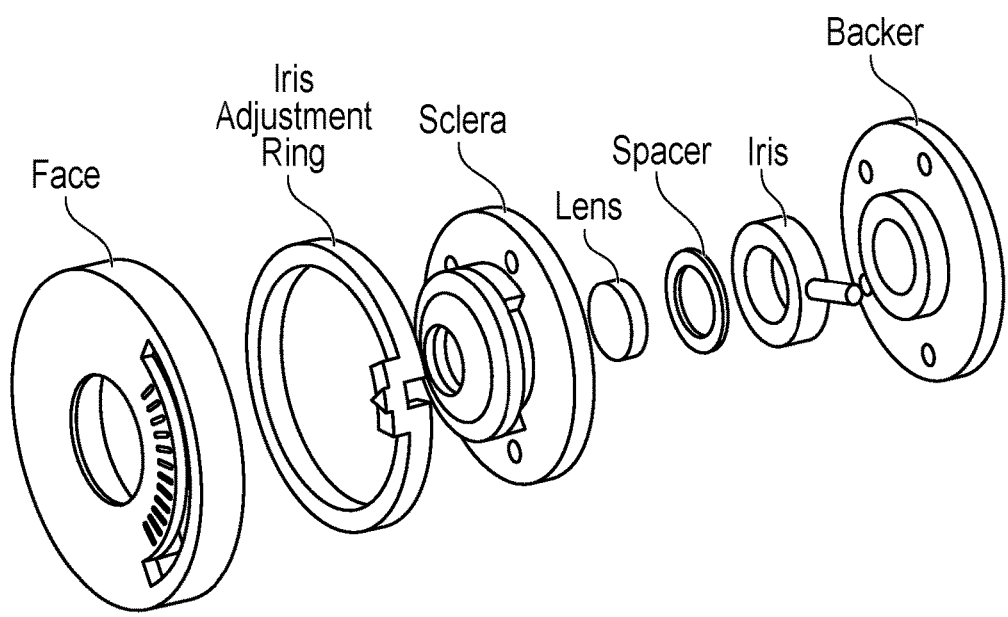
FIGS. 3a and 3b show different views of possible embodiment of the physical model of an eye, which may be made part of or removably mounted on the base unit shown in FIG. 2.
Figure 3B:
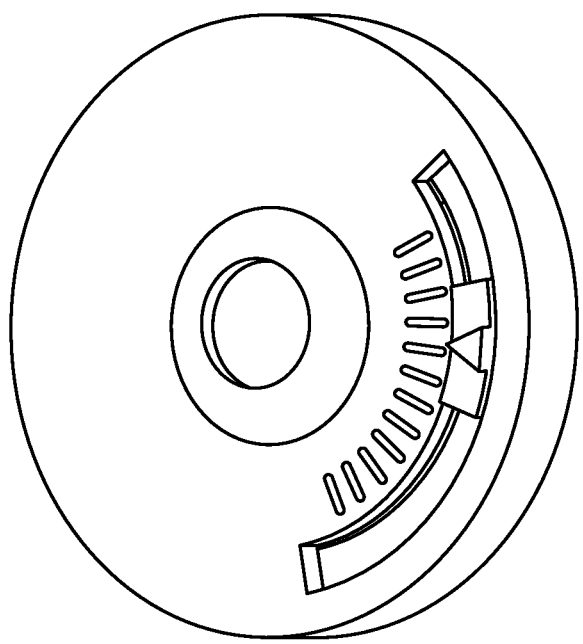

A particular embodiment of the eye model is shown in FIGS. 3a and 3b. In one aspect, a storage box may be provided for storing one or more of the components described.

The base system may incorporate or link to at least one computer. The computer may be a desktop computer or laptop that is linked to a mouse, screen and keyboard. A trainer may be able to operate the computer by way of the mouse, screen and/or keyboard. It should be understood that in other embodiments of the present invention, the computer may also be a tablet computer or any other computer device operable to allow a trainer access to the functions of the medical training computer program of the present invention. In particular, the trainer may operate the computer to view the images of physical defects or medical conditions that are simultaneously displayed to the one or more trainees by operation of the at least one medical training simulation apparatus.

The images may also include images of normal eyes. The system, computer program and computer-implemented method of the present invention may include training trainees to recognize the differences between images of a normal eye and an eye with a physical defect or medical condition.

During a training session that is led by a trainer, the trainer must be able to view the images that are simultaneously provided to each trainee in the trainer's group by the viewer of the apparatus because the trainer will explain the various features of the physical defects or medical conditions shown in the images to the trainee. The trainer may thereby provide information to the trainees regarding the defects or conditions that a trainee needs to know in order to be able to recognize and become familiar with the defects and conditions. The computer operated by the trainer may further be operable to provide tools to the trainer whereby the trainer can point to or otherwise highlight notable aspects of the defects or conditions shown in the images to the trainees.

The computer program of the present invention may further be operable so that the computer may be used by the trainer user to initiate, follow and/or control one or more medical training routines embodied in the medical training computer program of the present invention.

As shown in FIG. 1, which is a system diagram illustrating a possible system implementation of the present invention, the computer 10 may be linked, for example, such as through splitter 14, to a plurality of medical training simulation apparatuses 12, each being a simulation unit. The computer may incorporate or otherwise be connected or linked to a plurality of images 16. The images may include archived images. The images may be stored in a database. The plurality of images 16 may include images showing physical defects, medical conditions or medical tissues pertaining to a specific body part, such as in this case an eye.

The plurality of images may be displayed to a trainee in a medical training simulation apparatus by way of operation of an image display 18 that is a viewer element of the apparatus whereby images are presented to a trainee as a viewable image. The plurality of images that may be displayed in each medical training simulation apparatus may include a wide range of images showing a number of different physical defects, medical conditions or medical tissues. For example, the images may include digital images of physical defects or medical conditions affecting the eye that are relatively rare, and that therefore may not be found in human or animal subjects that may be available for medical training purposes. In this way, by operation of the present invention, one or more trainees may access, at a relatively low cost, a complete or substantially complete set of images, meaning that the set of images covers a wide variety of possible physical defects or medical conditions, and potentially all known defects and conditions that can affect a particular body part such as the eye.

It is also possible for the images to be stored as part of subsets or groups. For example, a subset may include images relating to physical defects, medical conditions and/or medical tissues that are prevalent in a particular area or for a particular segment or group of a population. As another example, a subset may include images related to rare defects, conditions or tissues. As yet another example, a subset may include images relating defects, conditions or tissues encountered specifically in populations of a particular age, such as children or aging adults. In this manner, embodiments of the present invention may provide sets or subsets of images, and for the purpose of training medical professionals, research or refreshers for medical professionals, or confirmation of an encounter with a rare defect, condition or tissue by a medical professional. A trainee or medical professional may not require exposure to a wide variety of images in some instances of use of the present invention, and embodiments of the present invention may be operable so that a trainee, trainer or medical professional may choose to limit use of the present invention to a subset of images.

The medical training simulation apparatus or simulation unit 12 includes an image display 18 and may include a controller 20 that provides on board control of the image display 18, whereby one or more images selected to be consecutively displayed to the trainee utilizing the apparatus by way of the image display. It should be understood that the control function of controller may be provided by connecting the apparatus 12 to the computer 10. This connection may be by way of a wired or wireless means, for example, such as a USB, a wireless data connection or any other suitable data connection between the apparatus and the computer. Through this connection, the computer program of the present invention that is operable by the computer is also operable to control the images displayed to the trainee by way of the image display.

By including the controller in the simulation unit, however, the simulation unit may enable one or more simulations by operation of the simulation unit as a self-contained, or stand alone, unit. This may enable the medical training simulation apparatus to be used in connection with a training routine initiated or directed by a trainer user of the computer, or a practice routine initiated by a trainee user of the computer without the involvement of the trainer user.

Therefore one aspect of the invention, is the use of the medical training simulation apparatus, system, and computer program of the present invention by a trainee without the involvement of a trainer. One advantage of the present invention is that the computer system and computer program can include functionality or content that enables a user to train on his or her own to improve medical examination skills using an ophthalmoscope, without the need for involvement of a human trainer. In one example of the implementation of the invention, there is provided a self-train workflow or routine in accordance with the present invention is provided.

The simulation unit 12 may also include a suitable optical means or "optics" 22 that may be optics operable to alter the one or more images displayed by the image display 18. This alteration of the image by the optical means may be configured to cause the appearance of the one or more images to be a realistic appearance that is related to the manner in which the defects or medical conditions would appear, using a medical examination tool (e.g. in one embodiment an ophthalmoscope) in a medical examination of a real subject patient. A skilled reader will understand that the use of optics may not be required to simulate the appearance of the eye using an ophthalmoscope on a human subject. More particularly, the images used may be relatively high definition and need to be resized in order to appear realistic. The simulation unit 12 may include a suitable lens selected for this purpose. Optics may not be required if the pixels of the display were small enough or packed closely enough.

A physical model may be incorporated in the simulation unit, or mounted on the simulation unit. The physical model may be formed to simulate the geometry that the medical professional is required to navigate using the medical examination tool when conducting a medical examination simulated. The simulation geometry may differ for particular embodiments of the invention, and the physical model may represent different body parts of a human or animal that has concealed anatomy.

In one aspect of simulating the geometry, the simulation unit may include components that are based on a realistic approximation of the geometry of the body part.

FIGS. 3a and 3b illustrate the structure of a possible physical model of an eye. The eye model shown in FIG. 3a may be removable from the apparatus and system and replaceable with another physical model element. For example, a physical model element that represents an eye, may be disconnected, and replaced with another physical model, such as one representing an ear.

In some embodiments of the apparatus or system of the present invention, the apparatus or system may recognize the physical model element connected to the apparatus or system at any point in time and may function to provide, using the image viewer component, solely images relating to the body part of the animal or human represented by the physical model element connected to the apparatus or system.

Figure 8A:
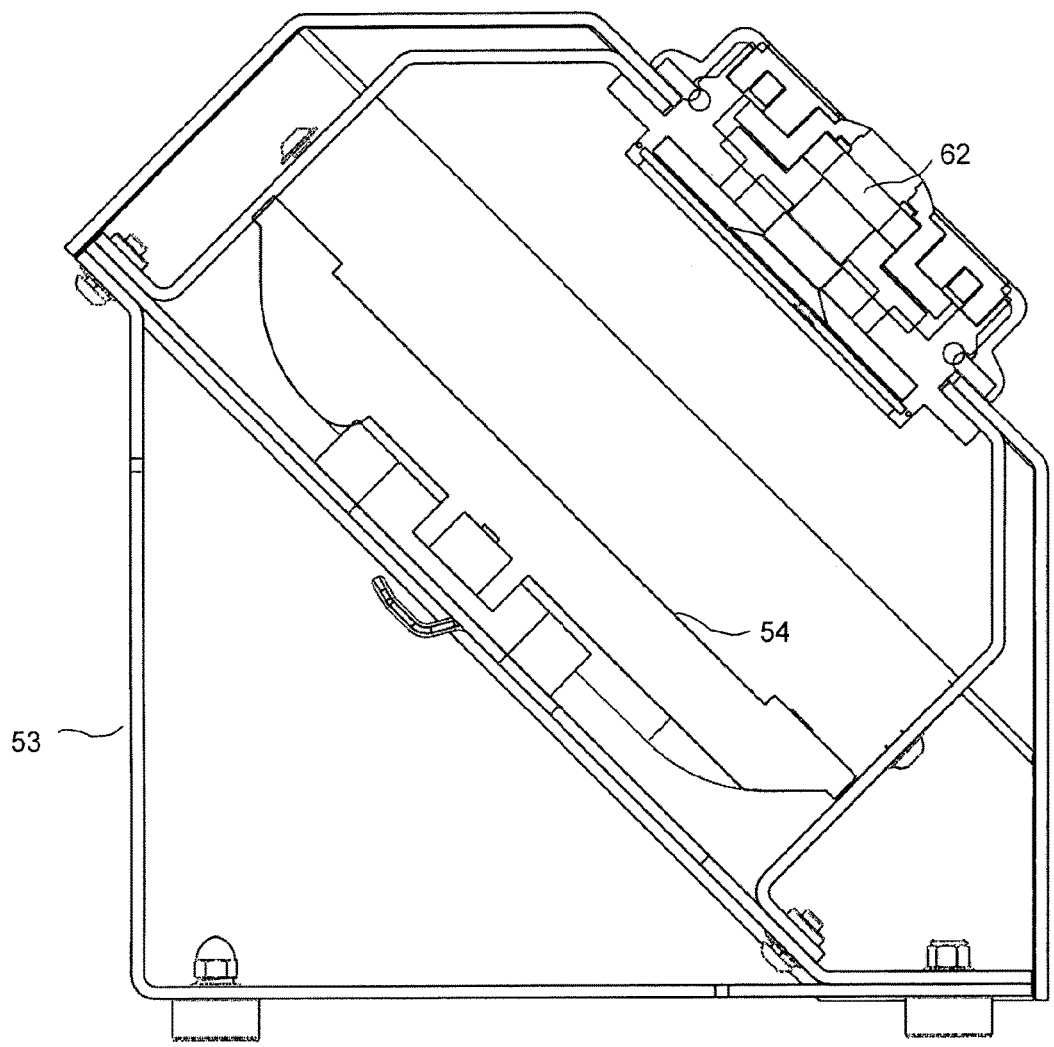
FIGS. 8a and 8b illustrates possible cross-sectional views of the base unit.
Figure 8B:
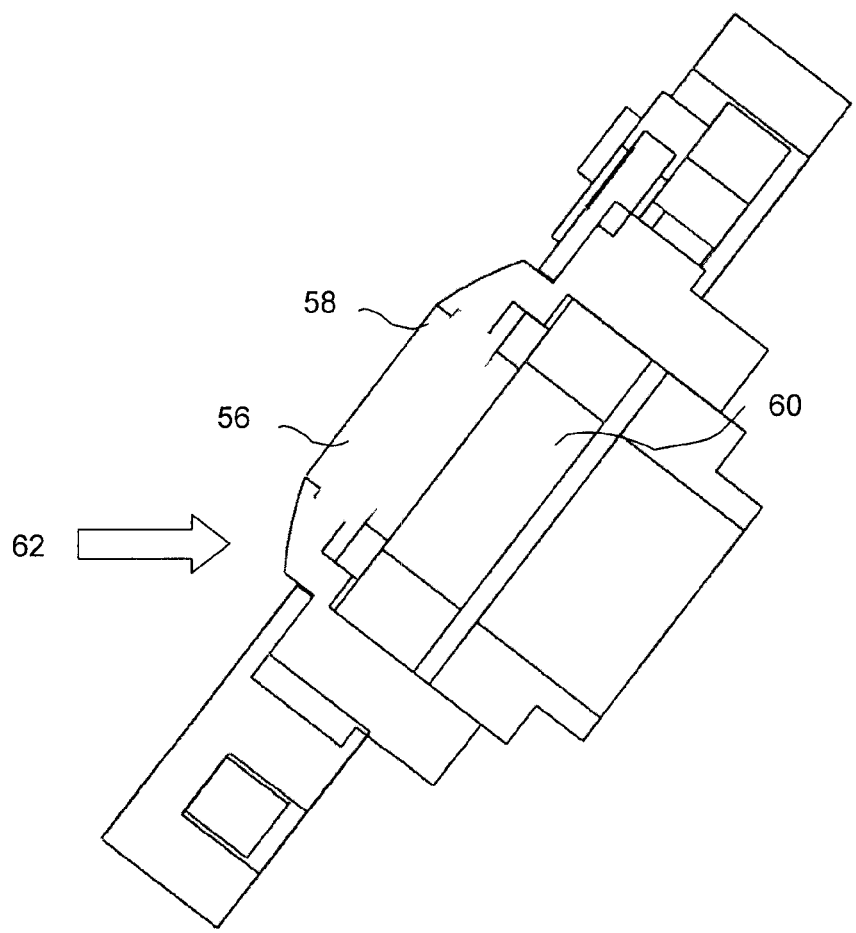

Various embodiments are possible. FIGS. 8a and 8b represent possible embodiments of a physical model simulating aspects of an eye. For example, as shown in FIG. 8b, the physical model may include aspects of the actual geometry of an average adult human eye with a horizontal distance, for example, such as of about 24 mm. The anterior segments of the eye may be recapitulated in the physical model representing an eye, consisting of the corneal layer 58, the ciliary body, and the iris. The corneal layer may be represented by a clear plastic layer 2 mm thick, the iris may be represented by an adjustable diaphragm 60, similar to those found in a photographic camera that is photo responsive by adjusting the diameter of the iris opening, and a lens 56, for example, such as a bi-convex lens, with a diameter of about 10 mm and an axial length of about 4 mm.

The physical model that represents an eye 62 may be attachable to a housing, as shown in FIG. 8a. The retina may be represented by images of eye disorders projected on the image display system 54 in the apparatus. The support frame 53 of the apparatus may be configured to support the apparatus upon a surface and may be configured to hold the physical model at a particular angle in some embodiments of the present invention to enhance the experience of a simulated medical examination or procedure of the trainee utilizing the apparatus.

Calibration

As described earlier, the system may embody one or more calibration mechanisms that may be used to determine the starting position of the ophthalmoscope device. This is in order to thereafter track the movement of the ophthalmoscope device and based on these movements, modify the display so as to simulate the use of the ophthalmoscope device in connection with a real subject.

As described above, in one embodiment of the present invention, the ophthalmoscope device may include a magnet which may be used to calibrate the system or to indicate that the ophthalmoscope device of the present invention is in the starting position. For example, a predetermined position or range of positions may be defined such that when the ophthalmoscope device is moved to achieve this position or range of positions, calibration is initiated. The magnet may be used as a specific mechanism for recognizing that the ophthalmoscope device is in the vicinity of the base unit so as to trigger calibration, and also to define a starting position. For example, a specific angle orientation may be defined such that when a user holds the ophthalmoscope device at that angle in the vicinity of the face of the base unit, calibration or re-calibration is automatically initiated and in response, the starting position is displayed or displayed again.

Training Workflow

Figure 4:
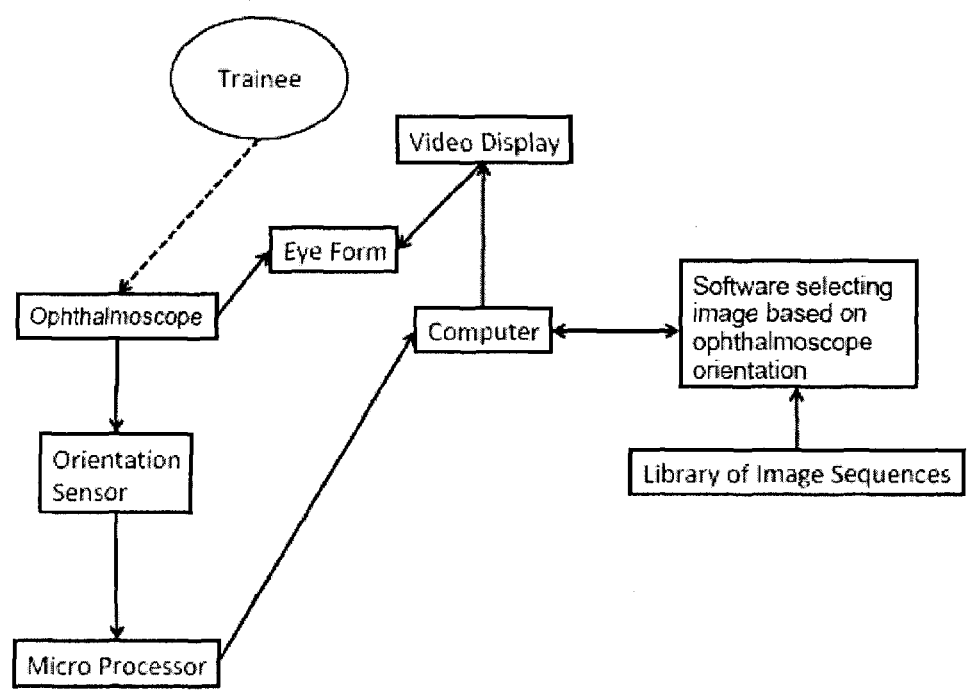
FIG. 4 is a flowchart illustrating a possible computer-implemented method in accordance with the present invention.

The following method may be used to conduct an ophthalmoscopy-related training session in accordance with the present invention, for example as shown in FIG. 4:

(A) A user holds the modified ophthalmoscope of the present invention;

(B) The user lines up the modified ophthalmoscope of the present invention with the physical model of the eye or "eye" form;

(C) Optionally, the user indicates that it is in a starting position or this is sensed by the system;

(D) Movements of the modified ophthalmoscope are detected by one or more orientation sensors, and this information is processed by a microprocessor that may be part of the modified ophthalmoscope or for example, a computer linked to the modified ophthalmoscope;

(E) A large image of an eye is selected based on one or more selection criteria (for example based on a training routine or input from the user or input from a trainer);

(E) Input data based on these movements are transferred to a computer associated with the base unit;

(F) The input data are used to determine the portion of the large image that is shown by the viewer that communicates with the eye form such that the user sees the image portion through the eye form using the modified ophthalmoscope; and (G) Optionally, the movements are detected, processed, and transferred in sequence and corresponding variations of the image portions displayed are processed by the base unit.

Based on the computer-implemented method above, the user is able to navigate within the full image, based on movements of the ophthalmoscope, within the full range of views available. The base unit is configured to enable the image display to present image sections that slide from adjacent fields-of-view based on the associated position information, so as to simulate viewing of the retina within the full range of view.

In another possible example of implementation of the present invention, the following describes a possible workflow of the present invention, in this case from the perspective of an examiner (usually an ophthalmologist):

(A) When examining a patient's right eye, an examiner normally holds the ophthalmoscope with his/her right hand and looks into the ophthalmoscope with his/her right eye. For a patient's left eye, the examiner generally uses his/her left hand and left eye. When developing skills using the simulation unit of the present invention, trainees may alternate between right and left hands/eyes so that equivalent facility may be cultivated on both sides.

(B) The ophthalmoscope is generally held by an examiner such that the index finger is placed on the wheel to adjust for dioptric correction. The dioptric correction should be initially set at zero then slowly turned to provide for a clear image once fundus objects are in view. Less adjustment is necessary if examiners wear their spectacles while using the ophthalmoscope. Also, as the dioptric correction only applies to spherical error, no correction for an examiner's astigmatic error can be made.

(C) With a real patient, an examiner normally rests his/her other hand on the patient's forehead or shoulder for stabilization and to use proprioception to allow for close approach. Using the system of the present invention, the examiner's hand may rest on the frame of the device. Real patients are generally approached from the temporal side and at the same level as the eye, with the examiner approaching from approximately 15 degrees, towards the optic nerve head. The red reflex of the fundus should be kept in the middle of the field of view as the patient is approached from just under an arm's length. The examiner, using the present system, can approach as close as possible to the eye model to maximize the field of view.

(D) If the optic nerve head is not immediately in view, then retinal blood vessels in the image displayed can be followed back to the optic nerve head. Their arborizing, acute angle can be followed backwards toward the nerve. The order of examination is mentioned elsewhere in this disclosure. In order to visualize different fundus objects, the examiner pivots the viewing axis through the eye model. For example, to view the superior retina, the examiner needs to drop his/her head and ophthalmoscope inferiorly to look up through the pupil toward the superior retina.

Further Aspects of Structure of Medical Training Simulation Apparatus

Now referring to FIG. 2, the medical training simulation apparatus may incorporate a housing that comprises a base and a top portion. The physical model of the eye 17 with an optional manual selector is shown in FIG. 2. When the physical model is attached to the housing, the combined elements define a physical structure that enables the simulations and the training described herein. The housing may include, for example, the optics and other components represented in FIG. 1, and described in greater detail in the Prior patent application.

The top portion includes a physical model or a portion of the physical model. The physical model is used as part of the simulation of the medical examination or procedure involving the particular body part represented by the physical model. The base portion enables the unit to rest upon a surface in a manner that is level or virtually level. For example, the base portion may rest upon a table. The base portion may be formed to hold and support the apparatus in a stationary position. Calibration may be adapted and also be used to adjust system operations if the base portion is not on a level surface.

The image display may be disposed within the medical training simulation apparatus and aligned with the physical model such that the image display, or more specifically an area of the image display, is visible through the opening of the physical model.

The present invention may be defined in accordance with a configuration for a medical training simulation apparatus that achieves the objective of providing a realistic simulation representing how physical defects or medical conditions may appear in a live subject patient, but that also uses an arrangement of elements that is inexpensive to produce and easy to use.

The image display of embodiments of the present invention may be a standard digital display unit, for example, such as an LCD. This enables the use of a relatively low cost image display means, for example, such as a standard, off-the-shelf LCD image display that is common enough to be at a low cost due to economies of scale. As a further example, the LCD screen may be a 7-inch USB monitor that displays images of various pathologic conditions.

The fact that the medical training simulation apparatus of the present invention is configured in a way that it enables the use of this type of a display unit contributes to the relatively low cost of the apparatus of the present invention. This in turn makes the apparatus accessible to a significant number of medical practitioners. Some prior art systems require expensive equipment, which some practitioners cannot afford; such prior art systems are prohibitively expensive so that some practitioners cannot access or use them. Accessibility aspects provided by the apparatus of the present invention, therefore, offers access to improved training for medical practitioners in medical examinations involving body parts with concealed geometry, generally.

In embodiments of the present invention, the image display may be connected to a USB port presented externally by the physical structure of the medical training simulation apparatus. The USB port may permit, for example, a cable connection to the trainer's computer. The USB port may alternately also permit a connection to a computer associated with the trainee. The USB port may further permit a connection to each of the trainer's computer and a computer associated with the trainee.

In one implementation of the present invention, the medical training simulation apparatus unit may be configured such that the one or more images displayed by the image display unit are sized so that, when viewed from the opening of the physical model, the one or more images cover all of the area visible through the opening of the physical model. In one embodiment of the present invention, the image projected on the surface of the image display (e.g. standing image or video projection) may range in actual size, such as from 2 to 4 inches in diameter. Image size may be modified depending on the nature of the image and the various optical parameters of the simulation apparatus.

The one or more images themselves may be made or selected so that they have an appearance, using lighting, exposure and other photographic techniques, that is consistent with the appearance of the applicable body parts and any relevant physical defects or medical conditions.

The contour of the one or more images may be made to correspond to the profile of the opening defined by the physical model.

In yet another embodiment of the present invention, the image display may be used and arranged to align with an optical means so as to provide a simple and cost effective means for altering the way in which the images appear to the human eye using a medical examination tool in relation to body parts with concealed geometry, while maintaining the colour and physical features of the images of the medical defects or conditions.

To this end, as shown for example in FIG. 2, the medical training simulation apparatus may be arranged in a way that it permits the physical structure to retain an optical means, for example, such as a lens. The lens may be held in place, disposed between the channel portion of the physical model and the image display (as shown for example in FIG. 3b). The lens may be operable to, in effect, de-pixelate the one or more images. The lens may be selected to provide an effective means to simulate the appearance of the physical defects or medical conditions shown in the one or more images.

In regards to the ophthalmoscopy application of the present invention, optical means adapted for ophthalmoscopy may be used. Ophthalmoscopes generally do not include magnification. However, given the size of the iris, only a portion of the larger plane disposed posteriorly from the iris is visible at any given time. Therefore the present invention simulates the appearance of a retina across a full range of views by enabling the user to switch from one field-of-view to another field-of-view based on movements of the ophthalmoscope. Further details are provided below under the heading "Display Control".

Display Control

In a further aspect of the invention, the system includes features that vary the display of the image, based on actions of the user, usually the trainee user. The system may include display control features that are designed for training in the use of a medical apparatus.

The display control features of the present invention are designed to simulate an ophthalmic examination based on movements of the modified ophthalmic examination tool triggering changes in the imagery displayed by the system.

An ophthalmic examination usually involves viewing a series of features of the eye in sequence where different sequences are possible. A representative order of ophthalmic examination may include the following order of steps: viewing (1) the optic nerve head, (2) retinal blood vessels, (3) the retina superior, nasal, and inferior to the optic nerve head, and finally (4) the macula. The macula is usually reserved for the end of the examination as this area is least comfortable and most difficult to examine.

In one aspect of the invention, the medical examination training system includes one or more position/orientation sensors. These position/orientation sensors may be made part of the modified ophthalmic examination tool so as to capture position/orientation information relevant to the orientation by the user of the modified ophthalmic examination tool. Use of this position/orientation information is discussed in greater detail below.

A skilled reader will appreciate that other mechanisms are possible for obtaining position/orientation information. For example, a motion sensing technology may be implemented in the vicinity of the base unit such that movements of the ophthalmic examination tool are detected and processed.

In one particular implementation of the present invention, data from position/orientation sensors may not be smooth enough to enable the variation of the section of the image of an eye that is displayed to the user depending on the movement of the modified ophthalmic examination tool by the user. In one embodiment of the present invention, the system includes one or more filters that are configured to filter the sensor information for example to remove noise and reduce sensitivity. This reduces motion jitter (when the modified ophthalmic tool is not moved), and reduces twitching (when the modified ophthalmic is being moved). The filters may be configured so that when the filtered sensor data are applied to vary the image sections displayed to the user, as further explained below, the variation of the display of the image sections simulates what the user of an ophthalmic examination tool would see through its viewer, including the changes to what they see based on manipulation of the ophthalmic examination tool.

A skilled reader will understand that different filters may be used, or different filter settings may be used, depending for example on the sensors used.

Figure 5A:
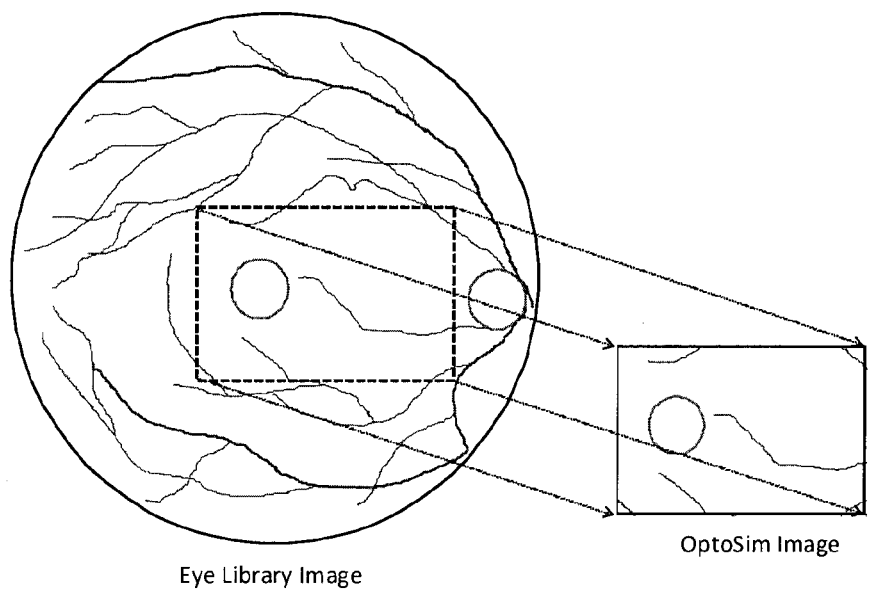
FIGS. 5a and 5b illustrate the sections of the image of an eye that are displayed using the field of interest viewer of the present invention.

First, as shown, in FIG. 5a, the computer system of the present invention uses images depicting a layer of the eye (such as the retina) which has a substantially circular shape. The user conducting an eye examination would be able to view at any time only a section of the entire eye through the tool, and usually a rectangular section thereof, although other shapes are possible depending on the tool. The viewable sub-section is simulated by providing a viewer that is configured to enable the viewing of an area of an image that is a sub-section of that image, for example, a rectangular sub-section as shown in FIG. 5a for example.

As shown in FIG. 5a, a library stored to the database may include library images of eyes that include an image of the entire retina. The system of the present invention presents for viewing a portion of that image using a field of interest viewer. The field of interest viewer is controlled by the system to enable viewing of a plurality of image portions covering cumulatively the entire image, or substantially all of the image.

In one aspect of the invention, the field of interest viewer of the present invention is controllable based on movements of the tool.

Figure 6:
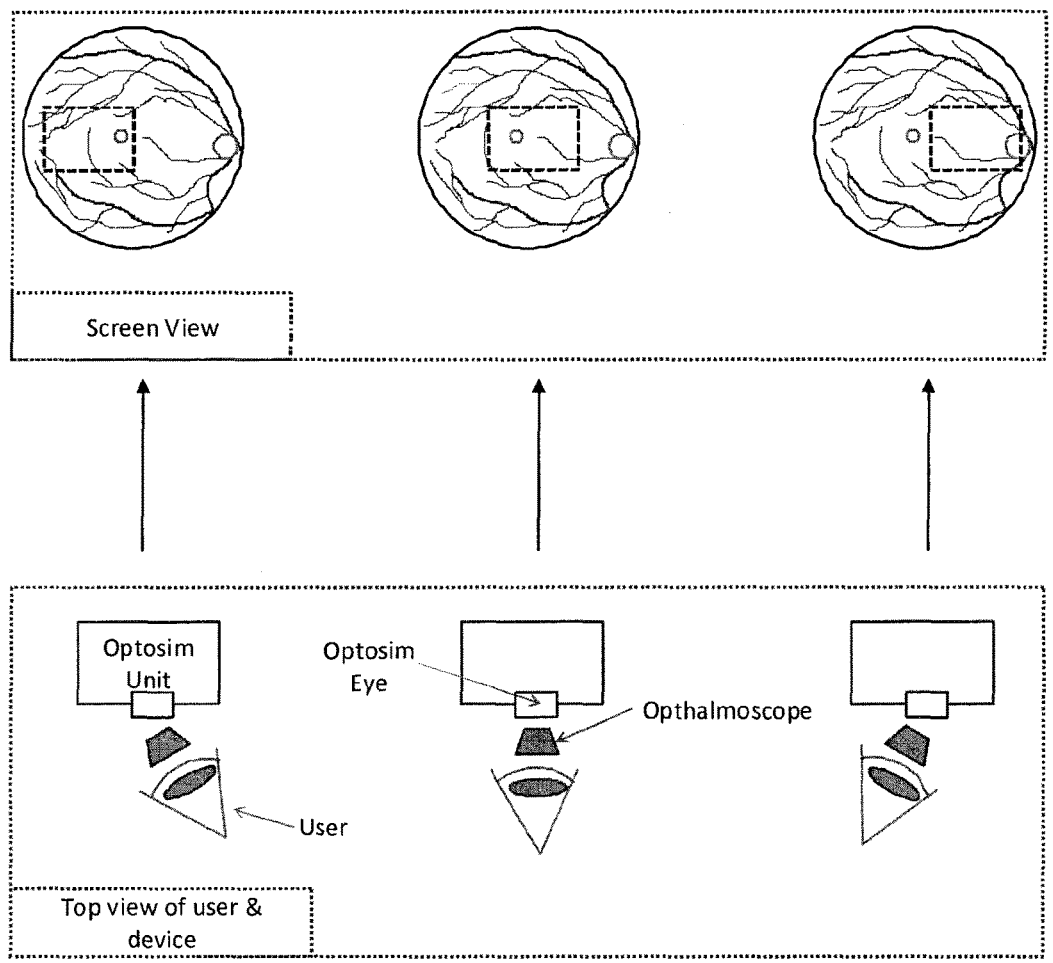
FIGS. 6 and 7a illustrate screen views presented by the system and the movements of the modified ophthalmoscope of the present invention that trigger these screen views.
Figure 7A:
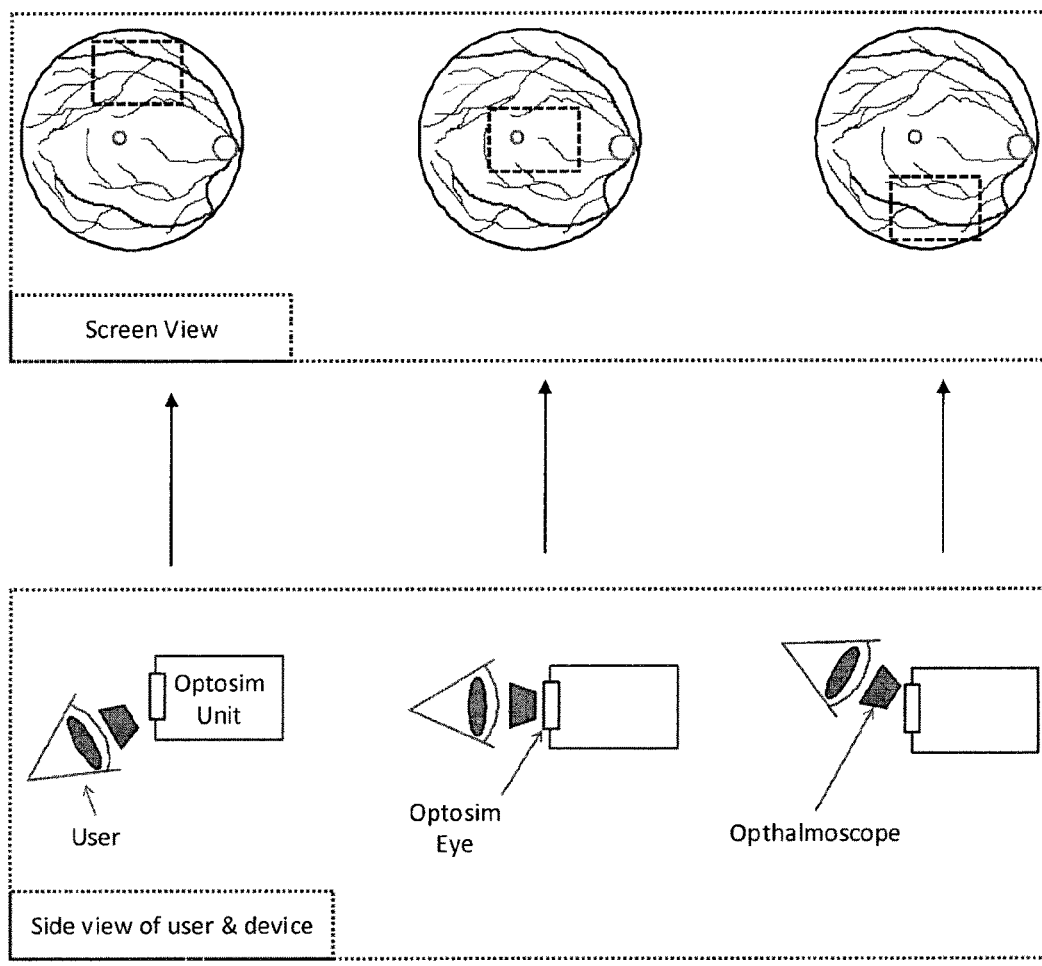

FIGS. 6, and 7a illustrate possible relationships between the position/orientation of the tool and the portion of an image of the eye (such as image of the retina) that is displayed by the base unit and is viewable through the opening of the eye model. A user of an ophthalmic examination tool does not see through the viewer the entire retina at once. Rather, the user must manipulate the tool to point the tool in different directions from a base starting position that is roughly on the axis of the centre of the eye. Depending on the different directions, the user may then view different sections of the retina. Ophthalmic examinations require the user to view selected portions of the retina and also, in some cases, to follow certain paths between selected portions of the retina. It is challenging for some users to learn to orient themselves to find particular features of the retina and to follow paths when they have, at any given time, only a partial view of the retina; navigation tools are not generally available to users for this purpose.

The modified tool may include a "reset" button that is used to confirm that the modified tool is in this starting position. Movements may be captured after that, and display of the image sections varied, as previously described.

In one aspect of the invention, the medical training examination system may incorporate motion tracking functionality. In one example, the user rotates the modified ophthalmoscope (for example along the cylinder axis), which changes a magnetometer sensor reading. This change is relayed to the computer, which in response shifts the field of interest viewer in the appropriate amount in the X direction.

The user may then (or may at the same time) tilt the modified ophthalmoscope which may change a position/orientation sensor reading. This change may also be relayed to the computer which in response shifts the field of interest viewer in the appropriate amount in the Y direction.

The present invention simulates this aspect of eye examinations and using one or more training routines, improves the user's ability to orient themselves and remain oriented in such eye examinations.

In one embodiment, a starting position for the tool is defined, and the computer system displays an image section that corresponds to that starting position, for example a rectangular section the centre of which is the centre of the image of the eye. Changes in positioning/orientation of the tool are thereafter detected, and corresponding adjustments are made to the image section displayed by the simulation unit, as shown by referring to FIGS. 6 and 7a.

A skilled reader will appreciate that position/orientation information of the tool may be correlated to the tool in a number of ways.

Figure 5B:
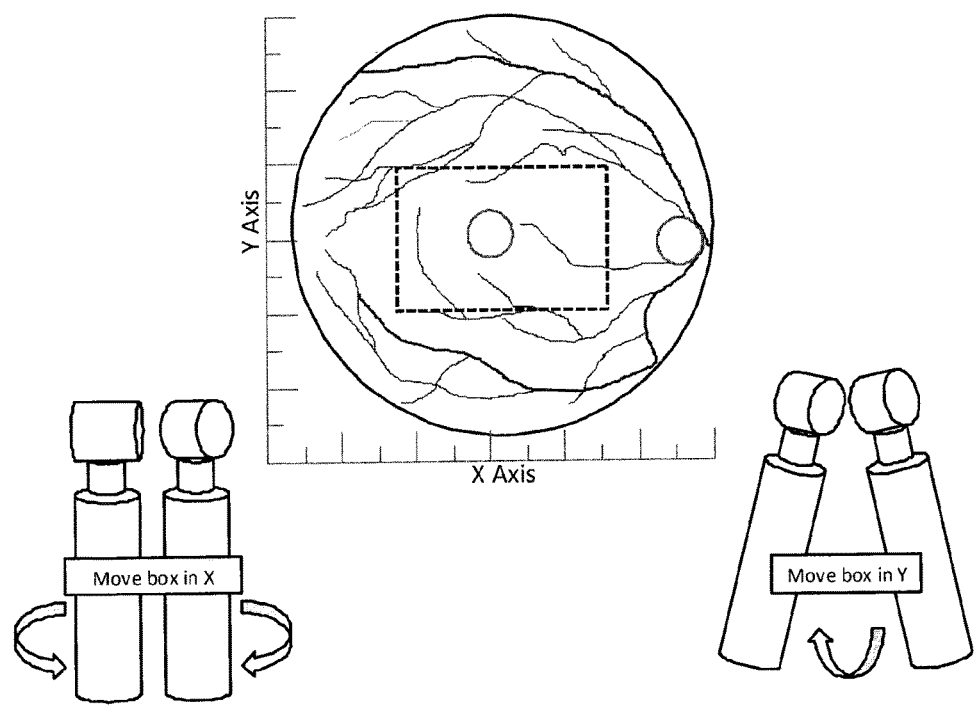

In one particular implementation, the position/orientation sensors are configured to detect a series of X and Y tilts of the modified ophthalmic examination tool, for example, as shown in FIG. 5b. The tilt information may be mapped to a series of possible tool positions. The tool positions are mapped to corresponding possible image sections, resulting in a change of the particular portion of the larger image shown in the viewer at any particular time. A smooth effect may be created by using a large number of possible tool positions and associated image sections. Various other techniques may be used to improve the simulation experience.

The computer system uses variation of image display using a field of interest box, based on input information from the movement of the tool. The viewing of the retina is simulated by presenting on a continuous basis the field of interest box where the image section shown by the field of interest box is varied to show different image sections as best shown in FIGS. 6a, 6b, 7a, and 7b.

In another aspect of the invention, the computer system also monitors the selection by the user of certain settings that may be associated with an ophthalmoscope. The ophthalmoscope generally includes a lens wheel featuring for example 25 corrective lenses from −30 to +20 diopters to allow focusing on a particular depth (from cornea to retina) in the eye dependent on the examiner's vision and the length (depth) of the patient's eye. For focusing on the retina on a patient that has a normal eyeball length, the wheel setting is at 0 diopters on the ophthalmoscope, assuming the user is not far-sighted (hyperopic). Using the positive or negative wheel settings, the examiner can overcome the intrinsic optic characteristics of both the user and the subject's eye and allow focusing on the particular segment of interest of the eye from retina to cornea (more positive wheel selections allow focus more anteriorly, more negative ones, more posteriorly).

In another aspect, the modified ophthalmoscope includes one or more mechanisms to detect the settings selected by the user and this information is transferred to the computer and used to select the particular layer of the eye that is viewed. As previously explained, the X and Y tilts enable the selection of different image sections in a plane. The settings input from the user may be used to select the Z plane of an eye that relates to an image, thereby enabling the simulation of a user focusing more anteriorly or posteriorly, as the case may be.

Figure 7B:
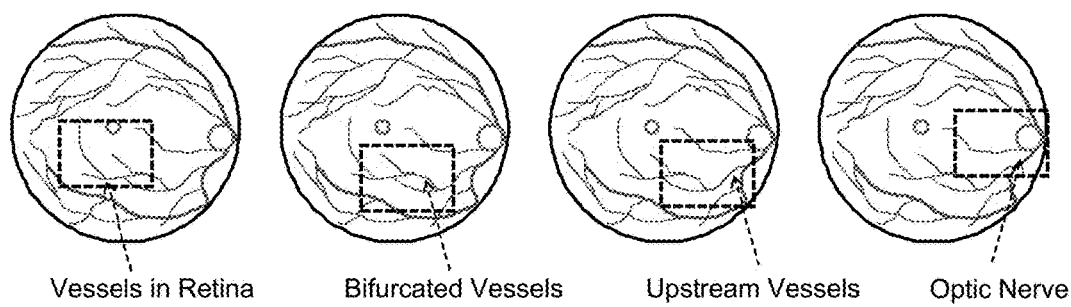
FIG. 7b is a diagram that illustrates the screen views presented by the system in accordance with a representative medical examination training routine.

As best illustrated in FIG. 7b, the medical training examination system of the present invention may be used to enable the user to interact with the system so as to simulate one or more medical examinations using one or more medical examination routines implemented by the system. Various eye examinations may have a defined sequence in which the user is to look for specific features in a specific order. FIG. 7b, for example, illustrates the following steps. First, a user looks into the eye and focuses on the vessels in the retina as shown in the first image from the left. Second, the user may then look for bifurcations, which are designated in the second image from the left by the arrow. Third, the user may travel "upstream" looking for larger and larger vessels, and following the larger vessels, as shown in the third image from the left. Finally, the user needs to find the optic nerve, which is usually at the confluence of the larger vessels as shown in the last image at the right in FIG. 7b.

A skilled reader will understand that the system of the present invention may be used to simulate various examinations including for example retinal detachment, fungal infection, neurological conditions, raised intracranial pressure, optic disk clarity (that may be related to head trauma, hypertension or diabetes), and so on.

Other Possible Features

A skilled reader will understand that various other functions or features may be added to various aspects of the system.

Various different implementations are possible, for example, numerous different components or technologies may be used to sense the direction of the ophthalmoscope. In one implementation, the handle may include a position/orientation sensor, which may include or consist of an accelerometer. In another implementation, a motion/position detection apparatus is adjacent to the ophthalmoscope and is configured to track the movement/position of the ophthalmoscope). Various motion tracking mechanisms may be used.

In another embodiment of the present invention, an input means (not shown) may be linked to the controller such that a trainee user of the simulation unit may selectively control the simulation unit to vary the images displayed by the image display. Any manner of input means may be used, such as a computer device linked to the simulation unit (not shown) for use by the one or more trainee users. The input device is operable so that the trainee user may select one or more libraries, sets or subsets of images stored to the database. The input means may be integrated with the simulation unit, for example, such as by providing access to a trainee to an external touch screen or pad for interfacing with one or more computer program components for displaying information. Access may further be provided by way of one or more menus whereby one or more libraries or set or subsets of images may be selected by the trainee, and a trainee may navigate within each selected library or set or subset of images. For example, the trainee may select different types of eyes (e.g. eye shape or different ocular medical conditions).

For example, the physical model of the eye may be given structural characteristics that simulate an eyelid that can open and close and the user is required to practice operating the tool with one hand and keeping the simulated eyelid open with the other.

The physical model of the eye may simulate the opening or closing of the iris by providing an adjustable aperture. This adjustable aperture may be provided by including in the physical model of the eye a structure similar to a camera shutter, which may be controlled by the computer and/or a manual actuator such as a sliding lever.

Human subjects of ophthalmoscopy examinations may, from time to time, blink or change the direction in which they are looking, despite being encouraged not to do so. These and other aspects of conducting ophthalmic examinations may be simulated by incorporation of corresponding features in the computer program of the present invention including, for example, the medical examination training routines implemented thereto. The movement of the eye by the user may be simulated by programmed "shifts" of the image section displayed to the user, without corresponding movements by the user. Blinking may be simulated by programmed, momentary blacking out of the display of image sections through the field of interest viewer of the present invention. In one possible implementation, the system may be configured to simulate this aspect as well by intermittently stopping the display control features, and returning, for example, the image to a home position, requiring the trainee to try to return to the area in which he/she had earlier been in the ophthalmoscopy examination.

The computer system and the computer program may implement a navigation tool that provides a full view of the image and indicates the currently viewed section of the image, similar for example to what is shown in FIG. 5a. This feature may improve the user's ability to orient him/herself.

In another possible aspect, the image of an eye may include various instructions or markings which may be used, for example, to highlight features or paths to be followed by the user. These may be included as an overlay that is presented by the computer system. The presentation of these features may be triggered for example by the instructor or for example based on actions of the user detected by the system. For example, feedback regarding the performance of the user (such as positive encouragement or highlighting of features missed by the user) may be integrated with the image using the overlay, so as to relate learning content directly to the viewed images.

The motion detection features of the present invention may be utilized to monitor actions of the user and to analyze these actions so as to assess performance automatically. Alternatively, a first level of user assessments may be presented, for example, to the trainer for review and confirmation/modification of the assessment. For example, certain thresholds may be established to determine, for example, whether a user has adverted to a particular feature. For example, the centre of the viewer may be required to be substantially aligned with an area defined for a feature in order to confirm that this feature was adverted to by the user. An indicator (visual, audible, or both) may be used to confirm that the computer system has logged the user's recognition of a feature for example.

For example, embodiments of the present invention may include various sensors whereby aspects of the simulated medical examination or procedure undertaken by the trainee using the apparatus may be collected. The sensors may be chosen and positioned so as to gather information regarding aspects of the simulated medical examination or procedure such as relating to the patient experience of the medical examination or procedure, relating to aspects of use of the medical tool by the trainee, or other aspects of the process of the trainee's hands-on experience of use of the simulated body part and the use of the appropriate medical tool.

For example, an embodiment of the present invention may be extended to provide haptic feedback to the user, for example, by incorporating one or more haptic devices in the physical structure of the apparatus of the present invention. For example, the physical model may be constructed so as to trigger an alarm if a user touches a sensitive area of a body part or manipulates the body part in a way that is not desired. The alarm may consist of auditory feedback or vibration of the physical model, or some other signal.

As another example, the physical model of an embodiment of the present invention may be constructed to include a sensor array (for example covering the inner surfaces of the physical model, or a portion). The sensitivity of the sensors in the array may be configured, working with clinicians, to correspond to the sensitivity of the body part in specific areas thereof. In a further aspect of the invention, a sensor array profile may be associated with each image, as the sensitivity of a body part may vary depending on the particular defect or medical condition. For example, force feedback sensors could be used such that once a user brings the medical examination tool into contact with a specific sensor, in a particular area of the physical model, and expresses with the medical examination tool a force that exceeds a specific threshold, an alarm or other feedback mechanism may be triggered.

In another embodiment of the present invention, the physical model may be impregnated with a combination of torque and pressure sensors in sections of the physical model. The pressure sensors may provide a feedback signal following detection of excessive force exerted by the trainee during use of the medical examination tool. Vibrations and noise may be emitted from the unit when excessive force is exerted on any regions of the physical model. To this end, the apparatus of such embodiments of the present invention may incorporate a speaker or other sound emitter means.

In the case of such an embodiment of the present invention wherein the physical model represents an eye body part, a photosensor for modulating the opening diameter of the diaphragm (iris) component is incorporated into the model. When light is emitted from the medical examination tool (e.g. the ophthalmoscope) into the eye of the physical model, a constriction and narrowing of the diaphragm (iris) opening may occur.

The haptic and feedback mechanisms described above that may be incorporated into the physical models used in embodiments of the present invention may enable more accurate simulation of real clinical scenarios.

In an embodiment of the present invention, a memory (not shown) may also be incorporated or connected to the of the simulation unit and linked to the controller such that an image library may be integrated with the simulation unit.

The control movements of a trainee may be stored to the memory. The stored movements may be analyzed by a scoring system. The scoring system may calculate an ophthalmoscopy score. The scoring system may also compare multiple scores. In yet another possible implementation, the system provides a feedback loop based on performance of the trainee. For example, the display may present information elements based on performance of the trainee.

A skilled reader will also understand that the present invention, for use for training users in conducting ophthalmoscopy examinations, may be made part of a multi-use system that may enable the switching of physical models of body parts with concealed anatomy. For example, an ear model may be switched for an eye model. A computer system may enable a user to select different modes, for example, an ophthalmoscopy mode versus an otoscopy mode, various optical modes, and the selection of a mode may trigger specific computer programs and associated image sets from a database that enable users to access one or more training routines and associated images, as further explained below.

A skilled reader will further recognize that the physical model of embodiments of the present invention may be formed to represent other body parts and to simulate the concealed geometry of such other body parts. Moreover, a skilled reader will recognize that multiple physical models may be attachable to the housing of the apparatus, so that multiple physical models, representing a variety of body parts, may each be individually connected to housing of the apparatus, so that one physical model is connected to the apparatus housing at one time. Multiple physical models may thereby be utilized with the other elements of the apparatus, including the image display, so that the apparatus and system of the present invention may provide a means of training in relation to a variety of body parts. The computer, image display and/or the optical means may be configured to cause the images displayed on the image display to simulate the appearance of defects or conditions shown in the images in the apparatus to appear as such defects or conditions appear in a live subject patient. The present invention may therefore provide a means of simulating the use of medical tools relevant to several body parts (for which there are physical models provided with the present invention) to view a simulation of the environment of a variety of defects and conditions viewable through the use of the medical tool.

One aspect of the invention is that the manipulation of the medical examination tool of the present invention enables the user to learn or practice the viewing of the human anatomy using the medical examination tool. Learning to use the medical examination tool may require learning the specific impact on the human anatomy of the use of the medical examination tool, as further explained below.

In embodiments of the present invention, there may be several physical models of various body parts provided as part of the medical training simulation apparatus. The physical models may be used individually with the image viewer. For example, a physical model that is an ear body part may be used with the viewer at one point and then be removed and replaced with another physical model for another body part, such as a nose. In this manner, the multiple physical models allow the medical training simulation apparatus to be used for training pertaining to: (a) the use of multiple specialized medical examination tools; and (b) multiple body parts.

The present invention may be utilized to train trainees, for example, medical professionals, to accurately conduct medical examinations (including to detect physical defects or medical conditions) while using specialized medical tools to investigate concealed anatomy. Body parts with concealed anatomy can represent difficult diagnostic environments. It is therefore important for medical practitioner trainees to learn to navigate within body parts with concealed anatomy environments. Navigation within such body parts requires learning to manipulate a specialized medical tool within the concealed anatomy, for example, such as an orifice defined by the body part with concealed anatomy, and to learn the impact of specialized medical tool manipulation on the viewing of the body part with concealed anatomy.

The present invention is operable to allow a trainee to learn to use these aspects to manipulate a medical too, and to navigate within a body part with concealed anatomy, which is represented by the physical model element of the present invention. In one aspect, where the concealed body part is the interior portion of any eye, the trainee can utilize the present invention to learn to manipulate the ophthalmoscope, accessing different fields of view, and to reorient despite eye movements of the subject.

In order to provide robust training to trainees, the image viewer of the training system of the present invention may provide ready access to a subset of images showing the relevant body part across one or more manipulations by the trainee of the medical tool. The trainee can therefore view a representation of a physical defect or medical condition relating to an eye and in the environment of the eye, which is provided by the physical model element of the present invention, as illustrated in FIG. 3a, for example. In this manner, the present invention is operable to train a trainee to learn how physical defects or medical conditions will appear specifically within the environment of an eye when viewed through a medical tool, and in connection with one or more manipulations by the trainee of the medical tool. This allows medical practitioners to learn to be able to identify such physical defects or medical conditions in difficult diagnostic environments while manipulating the medical tools.

The present invention may be used to improve the abilities of medical staff or medical trainees to diagnose such defects or medical conditions in connection with eyes. The images described in this disclosure may be accompanied with other associated information such as a case history, or information relevant to a case history, so as to provide a set of information elements that may be used to effectively train diagnostic skills in relation to physical defects or medical conditions relevant to eyes.

The present invention represents benefits and advantages over the prior art. For example, prior art training techniques are not generally effective in training medical professionals to navigate effectively within concealed anatomy, for example, such as concealed anatomy of an eye. Use of live subjects to learn to use the relevant medical tools may not be practical. Therefore, there is a need for a system that simulates body parts with concealed anatomy in a way that provides effective instruction. Designing a system with these characteristics requires significant innovation.

Prior art systems further fail to simulate the environment within which a medical tool is to be manipulated and other aspects of a medical examination. The present invention offers a benefit in that it is a training apparatus and system that simulates the environment within which a medical tool is manipulated in connection with a medical examination or procedure conducted for a body part with concealed anatomy. The present invention further provides ready access to image content that shows the body part in question in conjunction with the manipulations referred to. The image content is presented in a way that simulates the appearance of the eye as seen by the medical professional using the medical tool in question as when engaging in a training module using the system of the present invention. This enables the trainee to learn to manipulate a medical tool for examination of the eye and to accurately identify a physical defect or medical condition in a simulated environment that closely resembles the environment of a live subject.

Additionally, the present invention is a training system and apparatus that is simple to use and cost effective, contrary to prior art training systems and, therefore, represents yet another benefit of the present invention over the prior art. That the present invention is simple to use and cost effective represent aspects that cause the present invention to be utilizable in a variety of medical training environments by a variety of medical trainees.

The present invention may be made widely available and accessible for purposes of training medical practitioners. Training using the present invention may have the outcome that discomfort, pain or injury to patients is avoided because training occurs before the medical professional conducts an examination of a patient. The present invention may further improve the ability of medical professionals who have used the training system to accurately identify relevant physical defects or medical conditions existing in the eye and, thereby, improve the effectiveness and efficiency of diagnosis of such defects and conditions.

In embodiments of the present invention, the medical training simulation apparatus and system may be configured to enable a human user of the present invention to use a medical examination tool in relation to the physical model of an eye. The use of a medical tool in relation to an eye is required in medical examinations of the eye. Therefore, the present invention simulates a medical examination of a body part. The trainee may view one or more images relating to physical defects or medical conditions affecting the eye in a way that simulates the appearance of such defects or conditions as would be viewed during a medical examination of a live patient. Therefore, the present invention is operable to simulate the whole of the experience of a medical examination as experienced by a medical professional, including use of a medical tool, manipulation of the medical tool in relation to an eye, viewing of a physical defect or medical condition in the eye, and identification of the defect or condition.

The present invention may include physical models that represent an eye in a human or animal subject. The viewer may further provide images relating to the eye of a human or animal and relevant physical defects of medical conditions of the eye of a human or animal. Therefore, the present invention may be used to train a trainee in a simulated environment relevant to a human or animal subject. A skilled reader will recognize the variety of physical models and images viewable using the image viewer that may be incorporated in the present invention and the multiple environments that may be simulated by the present invention for training purposes.

The present invention offers still another benefit over prior art solutions in that it provides a training apparatus and system operable to enable highly effective medical training. The effectiveness of the training of the present invention is in part due to the operability of the present invention to enable the user to use the appropriate medical examination tool in relation to the physical model, which represents the appropriate anatomy, such as an eye. The effectiveness of the present invention is also related to the operability of the present invention to display one or more images of physical defects or medical conditions relevant to the physical model of an eye integrated through a connection to present invention. The images are provided in the present invention so that the physical model and image viewer in combination simulate real life anatomical geometry. The overall presentation of the present invention simulates the use of a medical tool in an eye and viewed through the medical tool of in relation to the body part in a human or animal subject. Prior art training systems do not offer the simulation environment offered by the present invention.

Thus, the medical training simulation apparatus and system of the present invention provides a significant advancement over the prior art. The present invention provides access to a significant number of images of physical defects or medical conditions relevant to the eye in connection with a simulated physical environment of the eye based on the physical mode shown in FIG. 2. The present invention is further cost effective and therefore accessible to a significant proportion of medical professional trainees. The present invention, therefore, can play a role in providing access to important medical training that the prior art cannot achieve.

In one embodiment of the present invention, a medical training system may be provided that includes one or more combinations of the physical model and the image viewer of the present invention, which are connected together to form a medical training simulation apparatus, and a further connection from each combination of a physical model and the image viewer, by a wired or wireless means, to one or more computers. At least one of the one or more computers may be operable by a trainer. The trainer may utilize at least one of the one or more computers to guide one or more trainees working at one medical training simulation apparatus through one or more training sessions. The computer or computers operated by the trainer may be configured as required for the trainer to provide training to the trainees.

Various Computer System Implementations

In one embodiment, each trainee may have access to a medical training simulation apparatus that is connected to a medical training computer program by way of a server, computer or other means. The medical training computer program may be operable to initiate one or more medical training routines. The medical training routines may control one or more of the medical training simulation apparatuses that are linked to the medical training computer program. A trainer may operate the medical training computer program, and thereby control the medical training routine provided to the medical training simulation apparatus.

In another possible aspect, multiple simulation units may be networked to provide a computer system including multiple simulation units, and one or more computers that may execute one or more automated training functions, or may execute a trainer utility that enables a trainer to direct one or more functions of the associate simulation units. For example the trainer utility may enable the trainer to select one or more training routines, or control the images displayed on the simulation units.

The medical training simulation apparatus utilized by a trainee may be located remotely from the computer or other means operating the medical training computer program that is controlled by the trainer. Thus, the trainee and trainer may be distantly located from one another. Alternatively, the trainee and the trainer may be closely located to one another. A skilled reader will recognize that there is a variety of methods of configuring the apparatus and the computer or other means for controlling the medical training computer program so that these elements are closely or remotely located from each other, for example, such as the incorporation of connections to one or more servers, the incorporation of an Internet connection, the incorporation of a cloud computing element, or other means.

The medical training computer program may be operable to enable one or more medical professional trainers to guide one or more trainees. A medical training simulation apparatus must be accessible to each of the one or more trainees. Each trainer may utilize the medical training computer program to guide one or more trainees through one or more medical training routines for which each trainee uses his or her medical training simulation apparatus. Thus, each trainer may train one or more trainees and multiple groupings of trainee(s) and trainer may exist. Each grouping of trainee(s) and trainer may utilize the medical training computer program to operate different medical training routines, or the same medical training routine but at a different pace. Thus, each grouping of trainee(s) and trainer may operate to undertake training using the medical training computer program independently but simultaneously. It may also be possible for one trainer to utilize the medical training computer program to train multiple groups of one or more trainee simultaneously.

A trainer may utilize a computer, a tablet, a smart phone or any other device or means to provide training utilize the medical training computer program to one or more trainees. In some embodiments of the present invention, the trainer may view an image content object that is projected in the apparatus of the one or more trainees as well as additional information, such as teaching notes or other data or other image content. The trainer may also be provided with tools that allow for indicating particular segments of interest in the images presented to the trainees. A skilled reader will recognize the various means of indicating particular areas of interest in the image content that may be available to the trainer.

A trainer who is closely located to the trainees, for example, such as in the same room, or other close vicinity, may provide oral instructions, lectures or other training to the trainees. The trainer may utilize the additional information provided by the medical training computer program in the course of providing oral training to the trainees.

A trainer who is located remotely from the trainees may provide oral instruction, lectures or other training to the trainees by way of an audio means, for example, such as by way of a telephone, a smart phone, a speaker system, a computer, a tablet, a laptop, video conferencing, or some other device or means of providing oral communication to a party located remotely from the speaker. In this manner, the trainees may each receive oral communication through an oral communication means, whereby the trainer may provide instruction to the trainees. A skilled reader will recognize the oral communication means and devices that may be incorporated in the present invention for this purpose, and that such means and devices may be integrated with the present invention or provided in cooperation with the present invention. For example, a trainee may use a conference telephone call simultaneously in cooperation with use of the present invention to provide oral communication, or the medical training computer program may be configured to collect the oral communication from the instructor and to distribute this to the trainees. In embodiments of the present invention, the communication between a trainer and the one or more trainees may be two-way so that the trainer can communicate orally with the trainees and the trainees can communicate orally with the trainer.

All oral communication to the trainees, whether they are closely located or remotely located from the trainer, may be provided additionally to, or simultaneously with, the presentation of images to the trainees in the apparatus through the use of the medical training computer program that is linked to the image viewer element of the apparatus.

A trainer may further utilize the medical training computer program so as to present images to the trainees in the apparatus, by way of the image viewer element, without providing any oral communication. For example, a trainer may present images to the trainees to test the trainees' skills for use of the apparatus and/or use of the medical tool with the apparatus, or to provide for the trainee to practice such skills and use of the medical tool. A skilled reader will recognize other various instances when a trainer may not provide any oral communication to the trainees.

As noted before, medical examination of body parts with concealed anatomy usually involves use of a specialized medical examination tool. The proper use of such medical tools generally requires instruction and practice. If a medical tool is not used properly, the medical examination may be ineffective. For example, if a medical tool is not used properly, the medical examination may be ineffective and result in a failure to correctly identify defects or medical conditions. Other misuse of the medical examination tool may result in unnecessary discomfort, pain or injury experienced by a patient.

Furthermore, the number of physical defects or medical conditions that medical professional trainees ought to be able to recognize in a patient's concealed anatomy can be significant. Prior art training methods involve displaying images of defects or conditions in a book or in a slideshow. The appearance of these defects or conditions in a book or projected on a screen as part of a slideshow is different than the way these defects or medical conditions appear when viewed during a medical examination. The different appearance can be due to use of the appropriate medical examination tool, the specific lighting, the limitations for maneuvering the medical examination tool due to space restrictions defined by the relevant anatomy, or concern for the comfort of, or pain to, the subject patient. Medical professionals must be trained to recognize physical defects and medical conditions in the environment of the concealed anatomy of the body part, and as viewed through the medical tool utilized to view the concealed anatomy. Without the appropriate training or experience, medical professionals can become disoriented in conducting medical examinations of an eye for example.

Thus, ineffective or insufficient training can contribute to medical professionals making mistakes while detecting and attempting to accurately identify the relevant physical defects or medical conditions existing in a patient's concealed anatomy. The present invention offers a means of providing the required training to cause a medical professional to efficiently and effectively accurately identify physical defects or medical conditions within an eye because it simulates the defect or condition in the eye and requires use of the medical tool normally utilized in a medical examination to scope and view within the eye, such as an ophthalmoscope.

The present invention is configured to provide an effective simulation of the appearance of the eye as it would appear in the course of a medical examination or medical procedure. The present invention also is operable to permit the selection from a variety of images relating to physical defects and medical conditions that may be viewed by a trainee in the apparatus simulated environment. In some embodiments of the present invention, the images may be categorized into subsets for more directed use of the present invention.

The images may be selected by the trainer and/or the trainee. Thus, the trainee can become familiar with viewing a wide variety of views of physical defects or medical conditions in the simulated environment and thereby become accustomed to identifying the defects and conditions as they would appear in a live subject patient. A trainee may benefit from the ability to choose particular images in order to become familiar with aspects of some physical defects or conditions at his or her leisure, or to learn better how to manipulate the medical tool within the eye to view a defect or condition. For example, a trainee may choose to view specific images during an individual practice session occurring outside of any trainer led session or testing session.

The wide variety of the images providing examples of a range of different physical defects and medical conditions that are available for training of a trainee in the present invention, including rare defects and conditions, is an element that causes the present invention to be cost-effective over the prior art. The prior art structures and approaches do not conceive of a design or method that enables a user to access to a wide assortment of images in a cost effective manner. The sheer range and volume of the images available to the trainees and trainers of the present invention and the method of providing these images to the trainees and trainers is cost-effective in light of the prior art and this is yet another benefit of the present invention over the prior art.

This present invention is particularly effective as a training simulation environment that provides access to an apparatus that provides training involving a significant number of different images, due to the design of the medical simulation apparatus and the overall system including the computer product aspect of the present invention. The apparatus, system and computer product of the present invention are provided in a cost-effective manner. In comparison to prior art systems, the training/instruction value provided by the present invention is cost-effective. For example, an embodiment of the present invention that is configured for the trainer to be located remotely from one or more of the trainees may permit a world expert to train trainees that are located in areas scattered worldwide. In this manner, the present invention may permit trainees in remote areas to receive hands-on simulated environment training from world experts. Providing this level of hands-on simulated environment training to trainees in locations remote from the world expert, and possibly remote from other trainees, is not possible with prior art systems.

Moreover, a trainee located remotely from a training facility may utilize an apparatus, that is linked to a computer system and a trainer, or that is a relative stand-alone unit, to train to recognize a wide variety of physical defects and medical conditions in a simulated environment. Such training would not be available to a remotely located trainee by prior art systems, as prior art systems offer a limited number of images/images to a trainee, images/video content that differ from the appearance of the defect or condition in a live subject patient, and image/image content that is not viewed through a medical tool in a simulated environment of a concealed anatomy and, therefore, does not appear as it would to a medical professional during a medical examination. Thus, the novel and innovative design of the present invention represents a significant advancement of the art and provides a practical and cost-effective system for broader dissemination of training instructions and/or training practice to trainees.

Additionally, it may be possible for an individual trainee to utilize a stand-alone apparatus for the purpose of training to use a medical tool within an eye. When used in a stand-alone manner, the apparatus of the present invention may provide images to the trainee by way of the image viewer, to be viewed through the medical tool within the eye, by the trainee. The image viewer may be configured to provide the images for viewing without the assistance of any outside computer element. Alternatively, in another embodiment of the present invention, a computer element that stores and is operable to provide the image content to a user may be incorporated into the apparatus.

In yet another embodiment of the present invention, the apparatus may be linked, by a wired or wireless means, to a computer, laptop or other device, that is local to the trainee. A version of the medical training computer program of the present invention may be installed, through a download or other means, on the local computer, laptop or other device, so that the local computer, laptop or other device is enabled to operate the medical training computer program. In this embodiment of the present invention, the medical training computer program may be configured to be operable to provide training to the trainee that may be utilized simultaneously with the apparatus, such as through oral communication teaching provided while the trainee utilized the apparatus and views particular images provided to the image viewer of the apparatus by the computer program. Portions of the training may also be provided non-simultaneously with the use of the apparatus by the trainee. The computer program may further be operable to provide for practice and testing sessions whereby the trainee may utilize the apparatus to practice and test his or her skills of manipulating the medical tool within the body part and accurately identifying physical defects or medical conditions.

Furthermore, an apparatus of the present invention that is linked to a trainer, and/or a group including a trainer and other trainees, may be configured to also be utilizable in a stand-alone manner from time to time. In this embodiment of the present invention the trainee may practice or test his or her skills on the apparatus outside of any specific trainer-led session or official testing session.

An additional aspect of some embodiments of the present invention that can keep the cost of the present invention relatively low is selection of components and the arrangement of such components. The quality of the simulation provided by the apparatus and system of the present invention may remain intact even if lower cost components are selected and arranged in the present invention.

The present invention is described herein in relation to medical examinations where use of the specialized medical tools involves viewing and identification of physical defects or medical conditions. Embodiments of the present invention may also be used for training medical professional trainees to perform medical procedures that involve utilizing a specialized medical tool and interacting with medical tissue having a specific appearance. In such an embodiment of the present invention, the viewer may be operable to present to the trainee for viewing one or more images showing medical tissue having specific appearances. The images will cause the medical tissue to be presented to the trainee in a manner that simulates how the medical tissue would appear in connection with the relevant medical procedure, for example, based on manipulations of a specialized medical tool by the trainee. The trainee may view the images through the specialized medical tool that would be utilized for the medical procedure when the medical tool is within the concealed anatomy that is simulated by the physical model element of the present invention. A skilled reader will recognize that the present invention may be utilized for other training uses purposes as well.

The present invention is further disclosed herein as a training tool, however, as many physical defects, medical conditions and medical tissues affecting patients may be rarely encountered during medical practice, the present invention may also be utilized by medical professionals as a means of research, comparison or confirmation of defects, conditions or tissues viewed in live patients for the purpose of accurately identifying the patient's defect, condition or tissue. In a similar manner, the present invention could also be utilized for updating or refreshing the skills of a medical professional. For example, a medical professional who is required to examine one or more patients susceptible to defects, conditions or tissues that the medical professional has not encountered or identified in the recent past (such as defects, conditions or tissues caused by an epidemic outbreak, those prevalent in a particular population the medical professional is about to work with, or any other reason that a medical professional may need to update or refresh his or her skills) may utilize embodiments of the present invention to update or refresh his or her diagnostic skills. A medical professional about to work with a different patient population than he/she is accustomed, such as children as opposed to adults, who will have different body part sizes and formations, may utilize embodiments of the present invention to update or refresh his or her tool manipulation skills. A skilled reader will recognize the variety of implementations that the present invention may have other than specifically as a training tool.

The computer program of the present invention may be implemented on the trainer side computer or a trainee side computer. The computer program may generally be configured so as to enable the creation of a training routine. The training routine may be developed and designed to provide training relating to and involving the display of one or more images of physical defects or medical conditions. For example, the computer program may include or be linked to a software utility for creating a trainer lesson or presentation. The trainer lesson or presentation may include one or more images, and also associated text, links, audio files, animations, or other content that serves the purpose of instruction or training in connection with the images. The content may be used by a trainer to explain the features of the images or associated information such as medical information concerning the defects or medical conditions shown in the images.

As discussed herein, the training session may involve an audio component and oral communication means or device, whereby oral communication between the trainee(s) and a trainer may occur to facilitate a lesson. The audio communication means or device may be integrated with the present invention system or may be distinct from the system, but cooperative with the system (such as a separate dial-in telephone conference call linking the trainer and the trainee(s), or a video conference on a laptop, or an online streaming video session on a computer, etc.). The communication means or device may include a telephone, a smart phone, a tablet, a computer, a laptop, a sound system or speaker system, or any other communication means or device. The oral communication may be bi-directional between the trainee(s) and trainer, or may only flow from the trainer to the trainees.

The computer program may further provide automated training sessions to one or more trainees, whereby no trainer is involved in the training session. Training sessions may involve the apparatus as well as segments whereby the trainee(s) views information, videos, or other content on a computer screen and does not utilize the apparatus, or may be provided solely through use of the apparatus. The automated training sessions may include an audio component which may be provided by a communication means or device that is any communication means or device described herein, and is a communication means or device integrated, linked to or otherwise connected with the present invention.

The lesson or presentation, by operation of the computer program, may be controlled by a trainer or an automated training session of the computer program, may be linked to the display of the images in the one or more apparatus. In this manner the trainer (or the computer program) navigates within the lesson or presentation and the medical training apparatus automatically displays the image or designated images indicated by the computer program, or otherwise chosen by the trainee. For example, the lesson or presentation operated by the computer program may include a slide or equivalent with information and that is linked to at least one of the images. The images for the lesson or presentation will be shown in a consecutive manner to the trainee through the image display of the apparatus, in accordance with the progression of the lesson or presentation.

The computer program of the present invention on the trainer side may be operable to display for the instructor a user interface including one or more areas. Each area may show to the trainer the image that the trainee sees in the apparatus in real time or near real time. A trainer is thereby able to conduct a training session for one or more trainees and in real time or near real time, wherein he or she may deliver instructions in response to what the trainer sees which includes the image that the trainee is viewing in the apparatus. The trainer may additionally see any or all of the following: further information; step-by-step instruction; detailed direction; feedback; or any other information relating to the lesson or presentation.

An advantage of the present invention over the prior art is that the trainer can provide effective instruction to more than one trainee at a time and can be fully aware of the image that is viewable by each trainee as the trainee is viewing said image. Prior art technologies generally merely provide for one-on-one training sessions and the trainer is not necessarily aware of what the trainee is viewing at any particular point in time.

For example, instructors can monitor the portion of the retina that their trainees are viewing and highlight specific characteristics while the trainees look through the modified ophthalmoscope of the present invention. Various other trainer/trainee functions are possible.

In another aspect of the instruction control computer program, the program includes a lesson plan creation component that provides instructions with a series of tools or templates for creating or assembling, and then storing to a database, a new lesson plan, tutorial or other training module, for use in connection with the system described. The lesson plan creation component of the present invention allows for the creation of different lesson plans based, for example, on the specific subject of one or more medical images. For example, different lesson plans may be created depending on the subject patient age or other factors that affect eye characteristics. A skilled reader will recognize the wide variety of lesson plans and modules that may be created an incorporated in the present invention.

In some embodiments of the present invention, one or more resources associated with the computer, or resources linked to or otherwise connected with the computer, may be implemented in a web server architecture or using cloud resources. This may enable central access to shared resources including medical images or lesson plans. Access to medical images or lesson plans may be provided as a web service or cloud service whether based on a subscription basis, pay per use basis or other model. Such access may also assist trainees having an apparatus of the present invention who are located remote areas to receive training that would not otherwise be available in such remote locations.

Embodiments of the present invention may also integrate one or more sensors or cameras operable to collect data regarding the trainee's actions. The collected data may be analyzed by operation of an assessment module of the computer program to generate assessments of performance, either automatically or on a user guide or approved basis. For example, the collected data may indicate force of a medical tool upon the physical model, depth of insertion of a medical tool into concealed anatomy of the physical model, time lapsed during use of a medical tool to view a simulated physical defect or medical condition shown as an image in the apparatus, or any other data relating to the use of the apparatus by a trainee. The analysis may provide feedback to a trainee such as whether aspects of the manipulation of the tool would be likely to cause pain for a patient, whether the length of time to view the defect or condition would likely cause discomfort for a patient, or any other analysis results.

In some embodiments of the present invention, and for some purposes, for example, such as a review or a practice session, the display of the images may be controlled by the trainee. If the trainer is involved in the session or linked in to the session, for example, such as review of a scheduled practice session, the computer program may display a screen to the trainer that shows the image being viewed by the trainee that was selected by the trainee.

If multiple trainees are individually controlling the display of images, for example, such as multiple trainees in a group of a trainer and trainees, the trainer may be able to view each of the images being viewed by each of the trainees as the images are viewed by the trainees simultaneously, or to choose to see the images being viewed by individual trainees or a sub-group of trainees. In such an embodiment of the present invention, the computer may be connected to two or more medical training simulation apparatuses. The computer program may be operable to display multiple screens to the trainer, each screen displaying the image then selected by the trainee for viewing by operation of the medical training simulation apparatus. The trainees in this case may control the display of images, whether based on, for example, a sequence defined by a lesson plan, or based on their individual discretion. If a trainee has a question, or the trainer wishes to selectively provide instruction to one or more trainees, the trainer may select the medical training simulation apparatuses of interest from the multiple screens (for example, such as is identified by a label associated with the particular apparatus or its user), to see what is being viewed by the trainees, and provide comments, instruction or feedback accordingly to one, several or all of the trainees.

In one embodiment of the present invention, the lesson or presentation of images may automatically follow the images viewed by one or more users simultaneously as controlled on the trainee side.

In an embodiment of the present invention, the trainer side computer program may be configured to be responsive to input from the trainer user (by way of the computer) regarding navigation between the images, slides presented to the trainer that incorporate information only displayed to the trainer and one or more images, or other similar content. The trainer side computer program may be operationally linked to the one or more medical training simulation apparatus, so that the computer program controls the image display and causes it to display the image selected by the trainer by way of the trainer's navigation between the images, slides or other similar content.

In an embodiment of the present invention wherein a computer is linked to the medical training simulation apparatus at the trainee side, the computer may be configured to display the lesson or presentation, or a trainee version thereof. This may be useful to check features highlighted in the version of the image frames shown in the medical training simulation apparatus, or to view associated information displayed in the lesson or presentation such as magnified features of specific area, links to associated information, and other content.

In another embodiment of the present invention, the trainer side computer program may be operable to allow the trainer to initiate the computer program to mark the images, for example, such as marking using a digital overlay. Such marking may be utilized to highlight, lasso, point to or otherwise select one or more areas of the one or more images. A suitable input means, for example, such as a digital pen or mouse, may be utilized for marking. The trainer may further initiate the image display in the apparatus of each trainee connected to the trainer to show these aspects marked in the images, as initiated by the trainer. So that the one or more images displayed by the image display of each apparatus utilized by a trainee, will show the image with the markings incorporated in the image by the trainer.

Alternatively, markings on one or more images may be displayed by the computer on the trainee side. As a further alternative, the trainee side computer program may enable the same or similar operations which may serve to highlight the areas of one or more images. For example, one or more trainees may be able to highlight a specific area in an image frame. The trainees may utilize this facility of the present invention to mark a section of an image frame that the trainee has a question about so a trainer can better understand the trainee's question. This facility of the present invention may have other uses as well.

Embodiments of the present invention may be implemented to achieve distance learning. One or more features described above may be used to enable training where the trainer and one or more trainees are at different locations. Each trainee will have an apparatus to use during training session and may also have a trainee side computer, although a trainee side computer is not necessary for remote training. The trainer will have a trainer side computer operable to run the training computer program. It will be obvious to a person skilled in the art that a suitable remote access and control technology can be deployed between the computer and one or more medical training simulation apparatuses at one or more remote locations from the computer, and also optionally between the computer and the trainee side computer associated with the medical training simulation apparatus at the trainee location, so as to enable remote training operations. For example, the computer may be linked to one or more medical training simulation apparatuses to enable remote control of each apparatus by the trainer by operation of the trainer's side computer program.

In embodiments of the present invention, the database may be linked to a web server or cloud computing network, optionally configured to enable upload and sharing of images by multiple users in multiple locations. The database linked to a web server or cloud computing network may further be operable to download of one or more images from a plurality of medical training simulation apparatuses linked to the web server or cloud computing network via the Internet.

The system of the present invention may also incorporate a testing component that requires, for example, each trainee to follow an exercise that involves viewing of one or more the images of specific physical defects or medical conditions using the medical training simulation apparatus. The user may be required to provide feedback, for example, such as orally answering a question so that the answer is captured using a voice recording, providing input to a computer linked to the apparatus, or engaging an input means integrated with the apparatus. Questions in a test session may be for example, multiple choice questions associated with the image and displayed by the computer, and/or may ask a trainee to identify the defect or condition shown in a particular image.

The answers provided by the one or more trainees in a test session may be captured, and then analyzed for accuracy. In a particular implementation of the present invention, the results may be analyzed, and tracked over multiple training sessions and/or test sessions so as to monitor progress of training and report on the same. The results for each trainee may be displayed to the trainer, said trainee, and/or all trainees. Displaying results of all trainees for all of the trainees to see may foster competition amongst the trainees. Results may further be analyzed relating to a group of trainees or all trainees utilizing the system.

Other aspects of gaming may be introduced in the present invention, for example, such as by defining rules requiring the trainees to identify correctly a particular number of physical defects or medical conditions from a series of images correctly, without exerting force using their medical examination tool that exceeds a defined threshold for a selected area of the physical model. Force exerted may be calculated using a sensor, for example, such as a sensor array integrated with the physical model. In this manner, both identification of defects and conditions as well as skilful manipulation of the medical tool in the body part may be taught and assessed by the present invention. A skilled reader will recognize how other sensors may further be integrated in the physical model to provide for other types of training and assessment of the diagnostic and medical tool manipulation skills of the trainees.

A skilled reader will understand that the present invention may be adapted to various other uses. For example, the present disclosures discuss the use of the system as a medical training system and method. Various other applications are also possible.

For example, the system and method of the present invention may be used for certification purposes. For example, the computer program of the present invention may be configured to embody one or more testing routines for testing competency, or that may be related to certification requirements. For example, a person taking a certification test may be required to recognize one or more defects or conditions in one or more images of eyes; the system may be configured to monitor the actions of the user so as prepare a report for use in certification.

The system may also be adapted to enable movements of expert users to be tracked, in order to enable the study of their examination techniques. For example, the system may be used to analyze the motions, speeds used, percentage of the eye examined and so on. The study of the techniques of experts may also enable the development of metrics of what constitutes a "good" eye exam. This information may then be used in connection with competency testing as described above.

A skilled reader will recognize that numerous training sessions, routines and operations are possible in accordance with the present invention. Embodiments of the present invention may incorporate various system and network configurations to facilitate and support particular training sessions, routines and operations, and to provide a wide range of possible medical training options and parameters. A skilled reader will recognize that various configurations and derivatives may be incorporated in embodiments of the present invention.

Computer System

Figure 9:
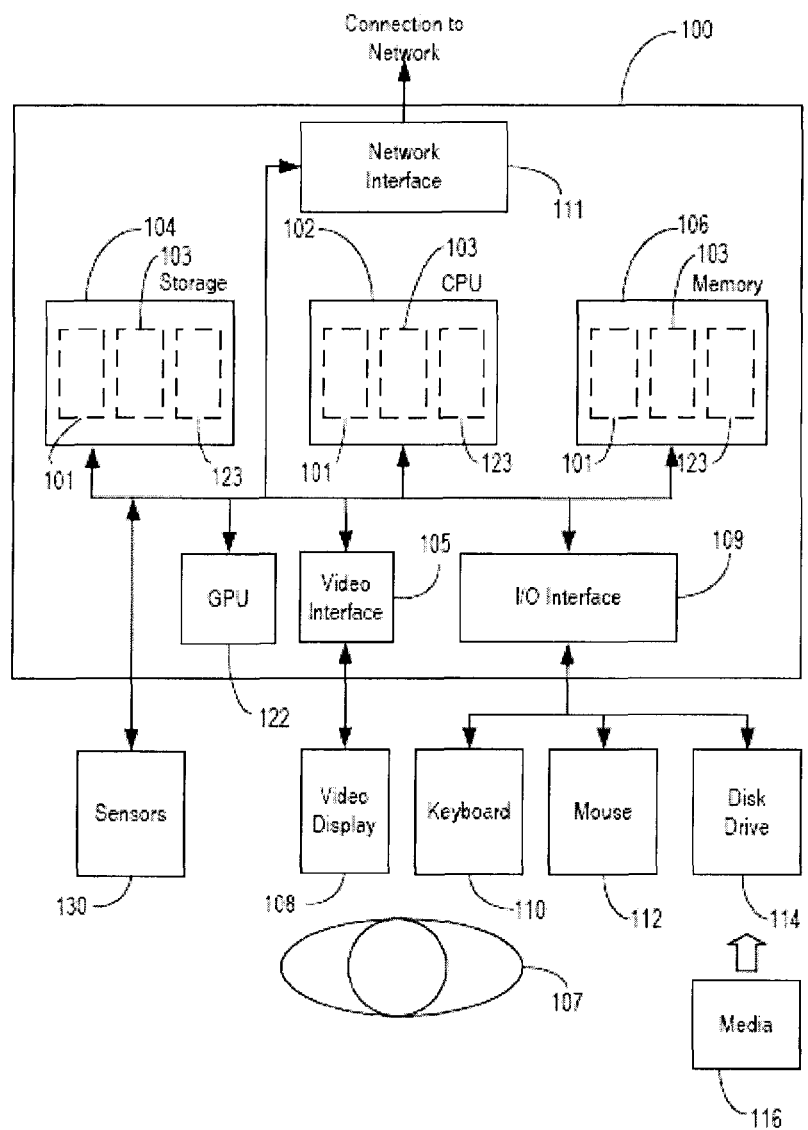
FIG. 9 represents a generic computer system for implementing functions of the system, computer program aspects, and the computer-implemented method of the present invention.

The computer system, computer program, and computer-implemented method aspects of the present may be practiced in various embodiments. A suitably configured computer device, and associated communications networks, devices, software and firmware, may provide a platform for enabling one or more embodiments as described above. A possible generic computer implementation is shown in FIG. 9. By way of example, it should be understood that computer may refer to a generic computer device that may include a central processing unit ("CPU") connected to a storage unit and to a random access memory. The CPU may process an operating system, application program, and data. The operating system, application program, and data may be stored in storage unit and loaded into memory, as may be required. Computer device may further include a graphics processing unit (GPU) which is operatively connected to CPU and to memory to offload intensive image processing calculations from CPU and run these calculations in parallel with CPU. An operator may interact with the computer device using an image display connected by a image interface, and various input/output devices such as a keyboard, mouse, and disk drive or solid state drive connected by an I/O interface. In known manner, the mouse may be configured to control movement of a cursor in the image display, and to operate various graphical user interface (GUI) controls appearing in the image display with a mouse button. The disk drive or solid state drive may be configured to accept computer readable media. The computer device may form part of a network via a network interface, allowing the computer device to communicate with other suitably configured data processing systems (not shown). One or more different types of sensors may be used to receive input from various sources.

The present system and the computer-implemented methods described may be practiced on virtually any manner of computer device including a desktop computer, laptop computer, tablet computer, provided that minimal processing, memory and other hardware/software requirements are met. The present system and method may also be implemented as a computer-readable/useable medium that includes computer program code to enable one or more computer devices to implement each of the various process steps in a method in accordance with the present invention. It is understood that the terms "computer-readable medium" and "computer useable medium" comprises one or more of any type of physical embodiment of the program code. In particular, the computer-readable/useable medium can comprise program code embodied on one or more portable storage articles of manufacture (e.g. an optical disc, a magnetic disk, a tape, etc.), on one or more data storage portioned of a computing device, such as memory associated with a computer and/or a storage system.

We claim:

1. A computer-implemented medical training method, comprising:
    (a) one or more users engaging a simulation computer system to initiate an ophthalmic examination training routine by one or more computer processors, the simulation computer system including an eye model, one or more movement sensors, an image display, and a controller for controlling the image display that displays one or more images of an eye, wherein the controller executes one or more smoothing techniques for smoothing a transition between display of a first image section to a second image section;
    (b) each of the one or more users moving an ophthalmoscopy tool relative to the eye model while conducting the ophthalmic examination training routine;
    (c) detecting movements of the one or more users using the one or more movement sensors to generate input information to the controller; and
    (d) the controller iteratively using the input information to select and display a region of interest view from the one or more images of the eye, or the first image section and the second image section, that corresponds to the input information, and to initiate displaying the first image section and the second image section by the image display to simulate an appearance of the eye in connection with the ophthalmic examination training routine across a set of the movements of the one or more users and the input information.

2. The method of claim 1, wherein the simulation computer system iteratively: (a) detects and processes the movements of the one or more users: (b) selectively displays the first image section and the second image section; and (c) generates a continuous display of the first image section and the second image section that follow the movements of the one or more users based on consecutive detected movements of the set of movements which correspond to the first image section and the second image section to simulate the appearance of the eye during an the ophthalmic examination training routine.

3. The method of claim 1, comprising the further step of initiating one or more calibration steps for establishing a starting position for the ophthalmic examination training routine.

4. The method of claim 1, comprising the further step of logging the movements of the one or more users, and comparing the set of the movements of the one or more users to an ophthalmoscopy training profile.

5. The method of claim 4, comprising the further step of providing feedback to a trainee regarding performance in the ophthalmic examination training routine as compared to the ophthalmoscopy training profile.

6. A medical examination training system for simulating ophthalmoscopy comprising:
   (a) a computer system linked to at least one base unit, and including a controller, wherein the controller executes one or more smoothing techniques for smoothing a transition between displaying a first image section to a second image section;
   (b) the at least one base unit including or receiving one or more physical models of an eye, the one or more physical models including an opening and an image display viewable through the opening, the opening being configured to enable a trainee to line up a connected ophthalmoscopy device with the opening to view one or more images displayed by the image display, using the connected ophthalmoscopy device;
   (c) the computer system defining a starting position and thereafter tracking a series of movements made by the trainee using the connected ophthalmoscopy device, the series of movements defining an ophthalmoscopy examination; and
   (d) the computer system processing the series of movements made by the trainee to generate display control data, the controller using the display control data to control the image display to simulate an appearance of a human eye across the series of movements made by the trainee in the ophthalmoscopy examination.

7. The medical examination training system of claim 6, wherein an image library is linked to the computer system, and the image library contains the one or more images of the eye, and wherein the controller, based on the display control data, selectively displays a particular image section of the one or more images corresponding to the series of movements.

8. The medical examination training system of claim 7, wherein the image particular section of the one or more images includes one or more landmarks of the eye, and the controller enables the trainee to selectively view the one or more landmarks based on a defined ophthalmoscopy examination.

9. The medical examination training system of claim 6, wherein the computer system includes a movement detection component that detects the series of movements made by the trainee using the connected ophthalmoscope device relative to the at least one base unit.

10. The medical examination training system of claim 9, wherein the connected ophthalmoscopy device includes a plurality of diopter settings for selecting a diopter, and the series of movements detected by the computer system include changes made by the trainee selecting the diopter.

11. The medical examination training system of claim 10, wherein the plurality of diopter settings are used to determine a particular layer of the eye shown in the one or more images displayed by the image display.

12. The medical examination training system of claim 6, wherein the computer system is configured to train the trainee to identify a medical condition indicated by one or more features shown in the one or more images.

13. The medical examination training system of claim 6, further comprising a trainer computing device, the trainer computing device implementing one or more trainer features responsive to an input from a trainer for displaying image data and other information to the at least one base unit, each base unit associated with the trainee.

14. The medical examination training system of claim 6, wherein the computer system enables the trainee to learn how to manipulate an ophthalmoscope in order to conduct the ophthalmoscopy examination, including to locate and recognize certain landmarks of the eye.

15. The medical examination training system of claim 6, including a feedback component that compares the series of movements to a trainer profile, and provides feedback to the trainee.

16. The medical examination training system of claim 15, wherein the feedback component provides suggestions to the trainee for conducting the ophthalmoscopy examination.

17. The medical examination training system of claim 6, comprising a calibration device for defining one or more parameters for the starting position.

18. The medical examination training system of claim 17, wherein the calibration device includes a magnet.

19. The medical examination training system of claim 6, wherein the controller is configured to switch between displaying the first image section to displaying the second image section that is adjacent to a field of view of the first image section, based on the display control data.

20. The medical examination training system of claim 19, wherein the controller smoothes the transition between the first image section and the second image section to simulate the appearance of the human eye during the ophthalmoscopy examination.

* * * * *